United States Patent [19]

Kondo

[11] Patent Number: 4,902,888
[45] Date of Patent: Feb. 20, 1990

[54] OPTICAL FIBER SENSOR

[75] Inventor: Michio Kondo, Nagoya, Japan

[73] Assignee: Brother Kogyo Kabushiki Kaisha, Aichi, Japan

[21] Appl. No.: 282,502

[22] Filed: Dec. 12, 1988

[30] Foreign Application Priority Data

Dec. 15, 1987 [JP] Japan .................................. 62-316497
Dec. 18, 1987 [JP] Japan .................................. 62-322242
Dec. 28, 1987 [JP] Japan .................................. 62-335242

[51] Int. Cl.⁴ .............................................. H01J 5/16
[52] U.S. Cl. .................................... 250/227; 250/225; 250/231 R
[58] Field of Search .................... 250/225, 227, 231 R; 73/705; 356/356, 357

[56] References Cited

U.S. PATENT DOCUMENTS 4,800,266 1/1989 Poorman .......................... 250/231 R
4,818,064 4/1989 Youngquist et al. ............... 250/227

Primary Examiner—David C. Nelms
Attorney, Agent, or Firm—Oliff & Berridge

[57] ABSTRACT

An optical fiber sensor for detecting a change of an external subject, based on measuring and reference beams. The sensor includes an optical fiber or fibers for optically coupling a light transmitter/receiving portion and a sensor head portion. Where the measuring and reference beams are transmitted through the single optical fiber to the sensor head portion in respective two transmission modes having mutually perpendicular polarization planes, the sensor head portion may include a Faraday effect element for rotating the polarization planes of the measuring and reference beams, in order to switch the two transmission modes when the beams are returned through the fiber to the transmitter/receiver portion. The sensor head portion may include a device for returning the measuring and reference beams through the optical fiber as two linearly polarized beams having mutually perpendicular polarization planes and a phase difference of 90°. Where the measuring and reference beams are transmitted to the sensor head portion by the respective first and second fibers, the sensor head portion may employ a device for directing the two beams so that the measuring and reference beams are returned to the transmitter/receiver portion through the second and first fibers.

22 Claims, 22 Drawing Sheets

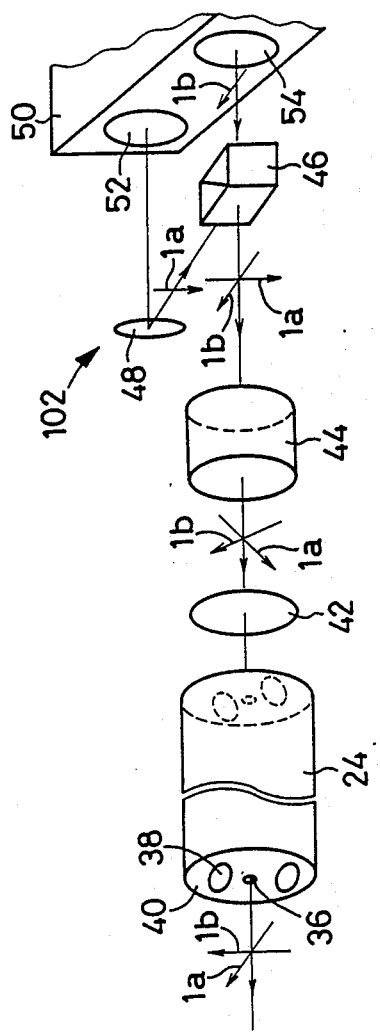
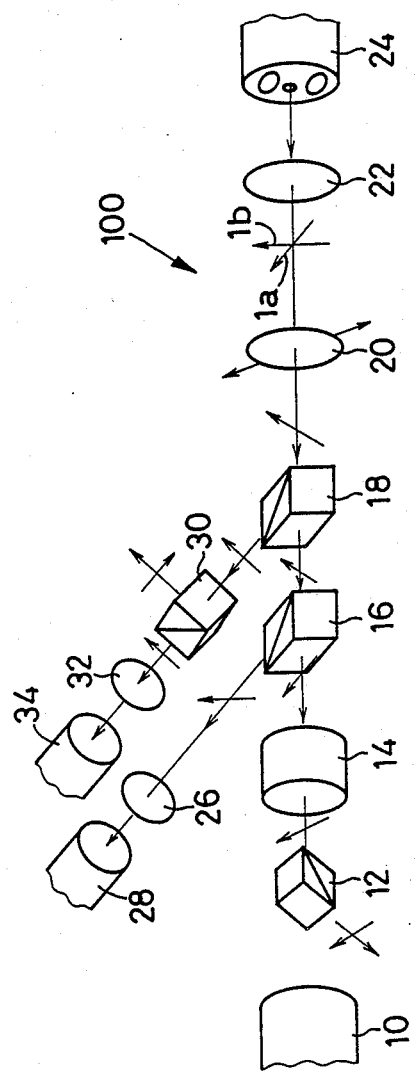
FIG. 4
FIG. 5

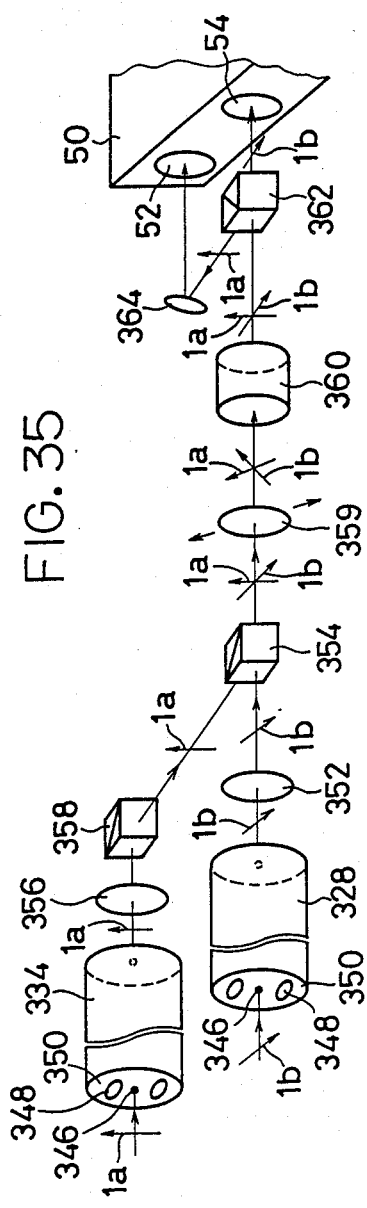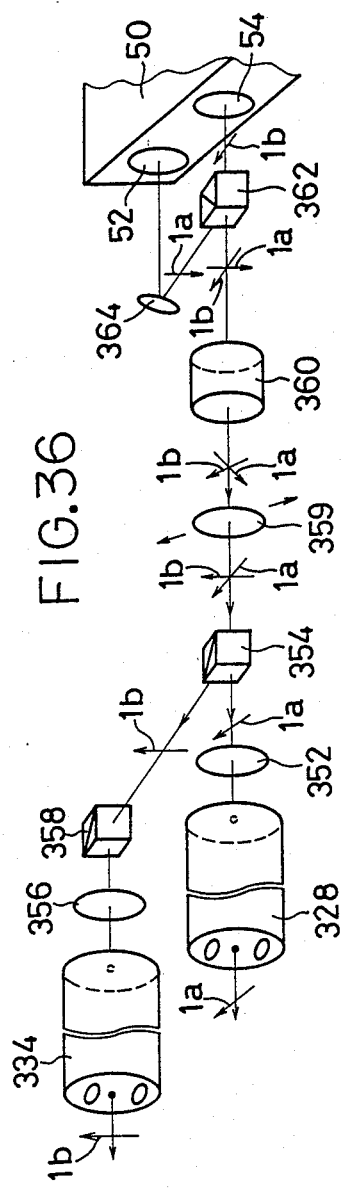

OPTICAL FIBER SENSOR

BACKGROUND OF THE INVENTION

1. Field of the Invention

The present invention relates to an optical fiber sensor which includes a light transmitter/receiver portion, an optical sensor head remote from the transmitter/receiver portion, and an optical fiber optically coupling the transmitter/receiver portion and the sensor head.

2. Discussion of the Prior Art

As a method of measuring a physical quantity, it is proposed to use an optical fiber sensor which includes: a light transmitter/receiver portion having a light source for producing a reference beam of light and a measuring beam of light, and a photosensor which receives the reference beam, and the measuring beam influenced by a subject, for determining the physical quantity associated with the subject; an optical sensor head which changes a transmission parameter of the measuring beam in relation to the external conditions; and an optical fiber for transmitting the reference and measuring beams between the light transmitter/receiver portion and the optical sensor head.

An example of an optical fiber sensor of an optical homodyning type is shown in FIG. 26, wherein a light beam 122 which is generated by a light source 120 is polarized in the "y" direction. The light beam 122 passes a polarizing beam splitter 124, which transmits the y-polarized beam 122 and reflects an x-polarized beam. The y-polarized beam 122 is then focused by a converging lens 126, on the end face of an optical fiber 128. This optical fiber 128 is capable of transmitting a polarized light beam while maintaining the same plane of polarization Namely, the polarization plane of the beam 122 is not changed while it is transmitted through the optical fiber 128. This type of optical fiber is hereinafter referred to as "fixed-polarization-plane optical fiber". The optical fiber 128 is adapted to transmit the incident beam 122 to the sensor head in one of two transmission modes $HE_{11}^x$ and $HE_{11}^y$ whose planes of polarization are perpendicular to each other, for example $HE_{11}^y$. In this example, the optical sensor head is constituted by a pressure-sensitive, fixed-polarization-plane optical fiber 132 wherein a light beam being transmitted therethrough is phase-modulated according to a variation in the sound pressure. This pressure-sensitive optical fiber 132 is optically coupled to the transmission optical fiber 128 such that the two fibers 128, 134 are rotated about the optical axes by 45 degrees relative to each other. That is, there exists a polarization plane deviation of 45° between the two fibers 128, 132. Therefore, the incoming light beam transmitted through the optical fiber 128 in one of the two transmission modes is transmitted through the pressure-sensitive optical fiber 132 in the two transmission modes. These two modes are reflected by a reflector film 134 on the end face of the optical fiber 132, and each of the reflected two modes is distributed as the two transmission modes $HE_{11}^x$, $HE_{11}^y$ of the transmission optical fiber 128, when the reflected two modes are incident upon the optical fiber 128. Consequently, the reflected two modes transmitted through the pressure-sensitive optical fiber 132 combine and interfere with each other. In this instance, therefore, the optical fiber 132 functions as a polarizer. Although either one of the two transmission modes $HE_{11}^x$, $HE_{11}^y$ from the optical fiber 128 may be received by the polarizing beam splitter 124, the mode $HE_{11}^x$ is utilized in this specific example of FIG. 26, as an optical signal from the beam splitter 124, so that the optical signal is converted into a corresponding electric signal by a photosensor 136. This electric output of the photosensor 136 represents a change in a selected transmission parameter of the measuring beam, for example, a change in the phase of the beam which is caused by the sound pressure to which the optical fiber 132 is exposed.

In the optical homodyning type of optical fiber sensor discussed above, an automatic adjustment of the initial optical phase of the sensor is necessary in order to provide the sensor with maximum detecting or sensing accuracy. To this end, a mechanical stress is applied to the pressure-sensitive optical fiber 132, so as to establish an initial phase difference or angle of $\pi/2$ between the two modes $HE_{11}^x$ and $HE_{11}^y$, in the example of FIG. 26. For instance, this stressing of the optical fiber 132 may be achieved by providing the fiber 132 with a piezoelectric element. In this case, however, the piezoelectric element increases the size of the optical fiber 132, and requires means for applying electric power thereto. Alternatively, the initial phase difference of $\pi/2$ may be established by controlling the wavelength of the beam produced by the light source. However, this alternative method is comparatively technically difficult to practice.

An optical fiber sensor of an optical heterodyning type is illustrated in FIG. 27, wherein a light source 140 such as a horizontal He-Ne Zeeman laser is adapted to produce two polarized beams whose polarization planes are perpendicular to each other, i.e., a measuring beam having a frequency f1 and a reference beam having a frequency f2 which is slightly different from the frequency f1. These beams are transmitted through a fixed-polarization-plane optical fiber 142, and incident upon a beam splitter 144, so that a part of the incident beams is transmitted through the beam splitter 144 while the other part of the beams is reflected by the beam splitter 144. The reflected beams are received by a photosensor 150 through a polarizing plate 146 and a reception optical fiber 148. The photosensor 150 is adapted to detect a reference beam beat frequency f2−f1. f1. Of the two beams which are transmitted through the beam splitter 144, the beam having the frequency f2 is reflected by a polarizing beam splitter 152, passed through a ¼ wave plate 154, reflected by a mirror 156 and again passed through the ¼ wave plate, whereby the plane of polarization of the beam is rotated so that the beam is transmitted through the polarizing beam splitter 152 and is received by a photosensor 158 through a polarizing plate 157 and a reception optical fiber 164. The other beam having the frequency f1 which is transmitted through the beam splitter 144 is passed through the polarizing beam splitter 152 and a ¼ wave plate 160 and reflected by a surface of a subject 162. The reflected beam is again passed through the ¼ wave plate 160, with the polarization plane being rotated. The beam is then reflected by the polarizing beam splitter 152 and received by the photosensor 158 through the polarizing plate 157 and optical fiber 164. The beam received by the photosensor 158 has a frequency f1±Δf1. This frequency shift is caused by a displacement of the subject 162. Thus, the photosensor 158 receives the beam having the frequency f2 which has not been influenced by the subject 162, and the beam having the frequency f1±Δf1 which has been influenced by the subject 162.

The photosensor 158 is adapted to detect a measuring beam beat frequency $f_2-f_1\pm\Delta f_1$. Outputs of the photosensors 150 and 158 are applied to a phase difference detecting circuit 166, so that a phase difference $\Delta f_1$ between the reference and measuring beam beat frequencies is detected. This phase difference represents information carried by the received reference and measuring beams, that is, an amount of displacement of the subject 162.

Unlike the optical fiber sensor of the optical homodying, the optical fiber sensor of the optical heterodyning does not require automatic adjustment of the phase. However, the divided parts of each of the reference and measuring beams having the respective beat frequencies are transmitted from the optical sensor head to the photosensors 150, 158 through the two different optical fibers 148, 164.

SUMMARY OF THE INVENTION

The present invention was developed in the light of the drawbacks encountered in the prior art as described above. It is therefore an object of the present invention to provide a comparatively small-sized, inexpensive optical fiber sensor which uses an optical fiber or fibers for optically coupling a light transmitter/receiver portion and a sensor head portion for transmitting a reference beam and a measuring beam therebetween, and which is capable of highly accurately detecting a change in a transmission parameter of the measuring beam influenced at the sensor head portion, based on the reference and measuring beams received at the transmitter/receiver portion.

The above object may be attained according to one aspect of the present invention, which provides an optical fiber sensor for detecting a change in a transmission parameter of a measuring beam, based on the measuring beam and a reference beam, comprising: (a) an optical fiber for transmitting the measuring and reference beams respectively in a first and a second transmission mode which have mutually perpendicular polarization planes, such that the polarization planes are maintained; (b) a light transmitter/receiver portion for producing the measuring and reference beams and directing the measuring and reference beams to the optical fiber so that the beams are transmitted in the respective two transmission modes in a first direction from a proximal end of the optical fiber to a distal end thereof, the light transmitter/receiver portion being operable to detect the change in the transmission parameter of the measuring beam, based on the measuring and reference beams which have been returned through the optical fiber in a second direction from the distal end toward the proximal end thereof; (c) a sensor head portion operable to receive the measuring and reference beams transmitted through the optical fiber in the first direction, and causing the transmission parameter of at least the measuring beam to be influenced by a change of an external subject. The sensor head portion is adapted to return the measuring and reference beams to the light transmitter/receiver portion through the optical fiber in the second direction. The sensor head portion includes a Faraday effect element for rotating the polarization planes of the measuring and reference beams before the beams are incident upon the distal end of the optical fiber in the second direction so that the measuring and reference beams are transmitted through the optical fiber in the second direction in the second and first transmission modes, respectively.

In the optical fiber sensor of the present invention constructed as described above, the measuring and reference beams are transmitted through the optical fiber in the first and second transmission modes, respectively, in the first direction toward the sensor head portion. When the measuring and reference beams are returned from the sensor head portion to the light transmitter/receiver portion, the measuring and reference beams are transmitted through the optical fiber in the second direction in the second and first transmission modes, respectively. Consequently, both the measuring beam and the reference beam experience the same influence of the parameters of the optical fiber such as temperature, vibration and strain. In other words, the influence of the optical fiber on the measuring beam is counterbalanced by the influence of the same on the reference beam. Accordingly, a change in the transmission parameter of the measuring beam, which is given to the measuring beam at the sensor head portion due to a change of the external subject can be accurately detected by the instant optical fiber sensor, based on the measuring and reference beams which have been returned from the sensor head portion to the light transmitter/receiver portion.

The instant optical sensor may be adapted to practice an optical homodyning wherein the light transmitter/receiver portion uses a light source generating a monochrome radiation for producing the measuring and reference beams that have an initial phase difference at which the phase difference of the two beams is most sensitive to the change of the external subject. Also, the instant optical sensor may be adapted to practice an optical heterodyning wherein the light transmitter/receiver portion uses a light source for generating two beams having a small frequency difference, so as to produce optical beats of the two beams which serve as the measuring and reference beams. In either of the optical homodying and heterodyning methods of optical detection, it is neither necessary to use a piezoelectric element for mechanically stressing the sensor head portion, nor necessary to control the wavelength of the beam generated by the light source, in order to establish the initial phase difference of $\pi/2$ between the measuring and reference beams. Therefore, it is not necessary to apply electric power to such a piezoelectric element. Further, the use of the single optical fiber optically connecting the transmitter/receiver portion and the sensor head portion results in reduction in size and cost of the optical fiber sensor as a whole, and permits the sensor to be readily incorporated in a precision measuring, machining or testing device.

The above object may also be attained according to another aspect of the present invention, which provides an optical fiber sensor for detecting a change in a transmission parameter of a measuring beam, based on the measuring bean and a reference beam, comprising: (a) a single optical fiber capable of transmitting a light beam in two transmission modes having mutually perpendicular polarization planes, such that the polarization planes of the two transmission modes are maintained; (b) a light transmitter/receiver portion for generating the light beam for producing the measuring and reference beams and directing the light beam to the optical fiber so that the light beam is transmitted through the optical fiber in one of the two transmission modes in a first direction from a proximal end of the optical fiber to a distal end thereof, the light transmitter/receiver portion being operable to detect the change in the transmission parameter of the measuring beam, based on the measuring and reference beams which have been returned through the optical fiber in the two transmission modes in a second direction from the distal end toward the proximal end; (c) a sensor head portion operable to receive the light beam transmitted through the optical fiber in the first direction, and splitting the light beam into the measuring and reference beams. The sensor head portion is adapted to cause the transmission parameter of at least the measuring beam to be influenced by a change of an external subject, and return the measuring and reference beams to the light transmitter/receiver portion through the optical fiber in the second direction. The sensor head portion (102') includes adjusting means for adjusting the measuring and reference beams prior to incidence upon the distal end of the optical fiber, so that the measuring and reference beams are returned through the optical fiber in the second direction in the two transmission modes, as two linearly polarized beams having mutually perpendicular polarization planes and a phase difference of 90°.

In the optical fiber sensor constructed according to the above aspect of the invention described above, the light beam generated by the light transmitter/receiver portion to produce the measuring and reference beams is transmitted through the optical fiber in the first direction in one of the two transmission modes. The measuring and reference beams obtained at the sensor head portion by splitting the light beam transmitted through the optical fiber in the first direction are adjusted by the adjusting means, as two linearly polarized beams having mutually perpendicular polarization planes and a phase difference of 90°, so that the measuring and reference beams are returned through said optical fiber in said second direction in the respective two transmission modes. Consequently, both the measuring beam and the reference beam returned through the optical fiber in the second direction experience the same influence of the parameters of the optical fiber such as temperature, vibration and strain. In other words, the influence of the optical fiber on the measuring beam is counterbalanced by the influence of the same on the reference beam. Accordingly, a change in the transmission parameter of the measuring beam, which is given to the measuring beam at the sensor head portion due to a change of the external subject can be accurately detected by the instant optical fiber sensor, based on the measuring and reference beams which have been returned from the sensor head portion to the light transmitter/receiver portion and which have the phase difference of 90°. The use of the single optical fiber optically connecting the transmitter/receiver portion and the sensor head portion results in reduction in size and cost of the optical fiber sensor as a whole.

The object described above may also be attained according to a further aspect of the invention, which provides an optical fiber sensor for detecting a change in a transmission parameter of a measuring beam, based on the measuring beam and a reference beam, comprising: (a) a first and a second optical fiber capable of transmitting alight beam; (b) a light transmitter/receiver portion (100") for generating the measuring and reference beams and directing the measuring and reference beams to the first and second optical fibers so that the measuring and reference beams are transmitted through the first and second optical fibers, respectively, in a first direction from a proximal end of each of the first and second optical fibers to a distal end of the each optical fiber, the light transmitter/receiver portion being operable to detect the change in the transmission parameter of the measuring beam, based on the measuring and reference beams which have been returned through the second and first optical fibers, respectively, in a second direction from the distal end toward the proximal end; (c) a sensor head portion operable to receive the measuring and reference beams transmitted in the first direction through the first and second optical fibers, respectively. The sensor head portion is adapted to cause the transmission parameter of at least the measuring beam to be influenced by a change of an external subject. The sensor head portion returns the measuring and reference beams to the light transmitter/receiver portion in the second direction through the second and first optical fibers, respectively. The sensor head portion includes guiding means for directing the measuring and reference beams so that the measuring and reference beams are transmitted through the second and first optical fibers, respectively, in the second direction.

In the optical fiber sensor constructed according to the instant aspect of the invention, the measuring and reference beams are transmitted toward the sensor head portion through the first and second optical sensors, respectively. However, the measuring and reference beams are returned toward the light transmitter/receiver portion through the second and first optical fibers, respectively. Therefore, the instant fiber sensor does not suffer from reduction in the S/N ratio of the output signal of the sensor due to a stray light which would arise from crosstalks between the measuring and reference beams. Since both the measuring beam and the reference beam travel both the first optical fiber and the second optical fiber, influences of temperature, vibration, strain and other parameters of the two optical fibers on the measuring and reference beams are suitably counterbalanced, whereby the change in the transmission parameter of the measuring beam can be accurately detected at the transmitter/receiver portion, irrespective of the distance of transmission of the beams between the transmitter/receiver portion and the sensor head portion of the sensor.

The first and second optical fibers may be fixed-polarization-plane optical fibers capable of transmitting a light beam in two transmission modes having mutually perpendicular polarization planes while maintaining the polarization planes, or without changing the polarization planes. Alternatively, the first and second optical fibers may be single-polarization-plane single-mode optical fibers capable of transmitting the light beam selectively in one of the two transmission modes, such that the other transmission mode is suppressed by positively increasing the loss of the optical energy of that mode. Where the environments of the sensor are relatively stable, the first and second optical fibers may be ordinary single-mode optical fibers capable of transmitting a light beam in a predetermined transmission mode.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 2, 3, 4 and 5 are views explaining an operation of the optical fiber sensor of FIG. 1;

FIGS. 29, 30, 31 and 32 are views explaining an operation of the sensor of FIG. 28;

FIGS. 34, 35, 36 and 37 are views explaining an operation of the sensor of FIG. 33.

DETAILED DESCRIPTION OF THE PREFERRED EMBODIMENTS

Figure 1:
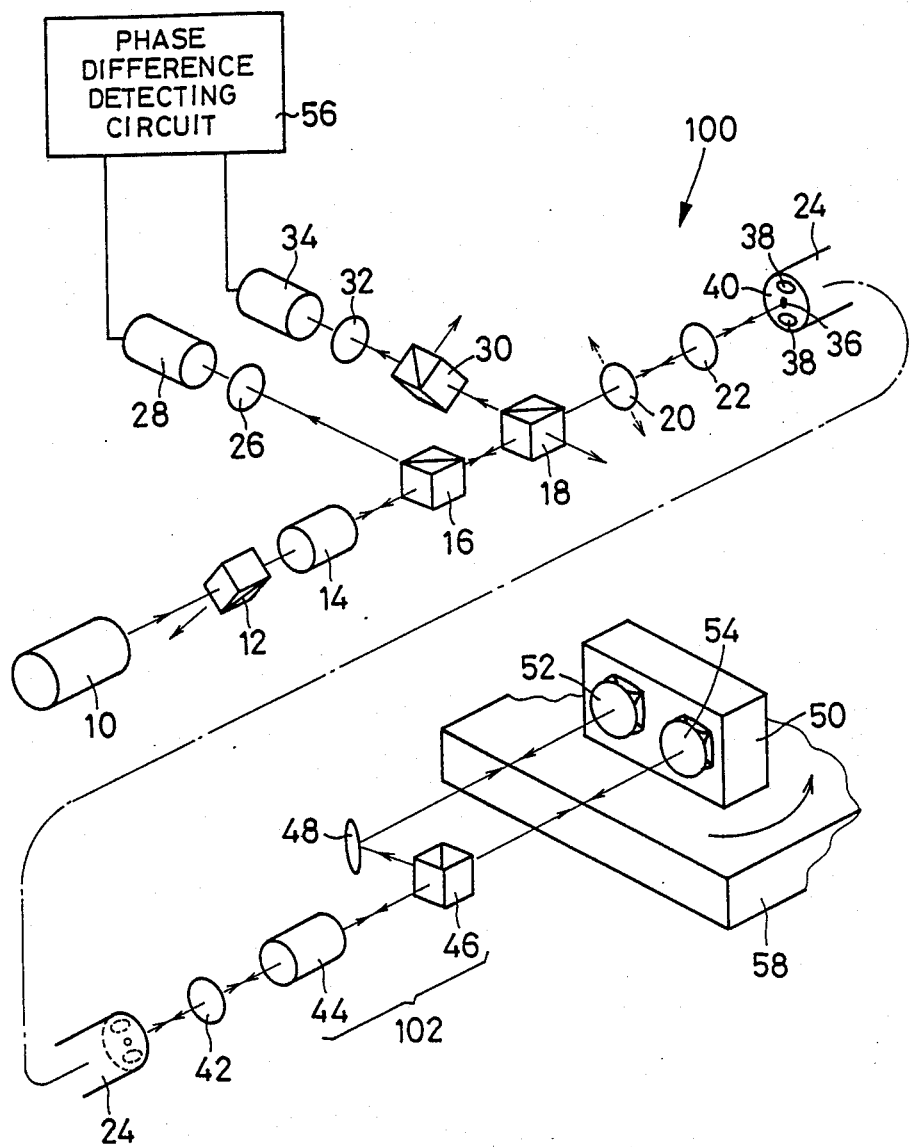
FIG. 1 is a schematic perspective view showing one embodiment of an optical fiber sensor of the present invention.

Referring first to FIG. 1, there is shown an optical fiber sensor of the optical homodyning type, wherein a monochrome laser beam produced by a laser source 10 such as a He-Ne laser falls on a polarizing beam splitter 12 which is positioned 45° rotated about an optical axis of the system. The polarized laser beam transmitted through the beam splitter 12 is incident upon an end face of a fixed-polarization-plane optical fiber 24, through a Faraday effect element 14, a polarizing beam splitter 16, a non-polarizing beam splitter 18, ¼ wave plate 20 and a converging lens 22. The optical fiber 24 transmits the laser beam without changing its polarization plane. The polarizing beam splitter 12, Faraday effect element 14 and polarizing beam splitter 16 function as an optoisolator for preventing the reflected beam from the optical fiber 24, from being directed to the laser source 10. The polarizing beam splitter 16 reflects a component of the reflected beam from the optical fiber 24, so that the reflected optical component is received by a first photosensor 28 through a converging lens 26. The non-polarizing beam splitter 18 performs its beam splitting function, without depending on the plane of polarization of the components of the beam. This beam splitter 18 is provided to reflect a component of the reflected beam from the optical fiber 24, so that the reflected component is incident upon a polarizing beam splitter 30 rotated 45° about the optical axis with respect to the beam splitter 18, and the necessary optical signal is emitted from the beam splitter 30 and received by a second photosensor 34 through a converging lens 32. The ¼ wave plate 20 serves to convert a linearly polarized light beam into a circularly polarized light beam. The wave plate 20 has a crystal axis indicated by arrows in FIG. 1. The optical elements which have been described above constitute a light transmitter/receiver portion 100 of the instant optical fiber sensor. The transmitter/receiver portion 100 is accommodated in a suitable housing, to which is secured the proximal end of the optical fiber 24 having the end face indicated above.

The fixed-polarization-plane optical fiber 24 consists of a core 36, a pair of stressing portions 38, 38 sandwiching the core 36, and a clad 40 which covers the core and stressing portions 36, 38. The optical fiber 24 is capable of transmitting a polarized beam such that the polarization planes of the two modes $HE_{11}{}^x$ and $HE_{11}{}^y$ that are perpendicular to each other are maintained. Accordingly, the circularly polarized beam emitted from the ¼ wave plate 20 is propagated through the optical fiber 24, in the two modes $HE_{11}{}^x$, $HE_{11}{}^y$.

The distal end of the optical fiber 24 is attached to a frame of an optical sensor head portion 102. The two modes $HE_{11}{}^x$ and $HE_{11}{}^y$ are transmitted as a reference beam and a measuring beam, respectively through the optical fiber 24. The reference and measuring beams are emitted from the distal end face of the fiber 24, and converted into parallel rays of light by a converging lens 42. The parallel rays of the reference and measuring beams are then incident upon a 45°-Faraday effect element 44, whereby the planes of polarization of the reference and measuring beams are rotated by 45°. The reference beam and the measuring beam are separated from each other by a polarizing beam splitter 46, so that the reference beam reflected by the beam splitter 46 is reflected by a mirror 48 in a direction parallel to the direction of propagation of the measuring beam which is transmitted through the beam splitter 46. The reference and measuring beams from the mirror 48 and the beam splitter 46 fall on a first corner cube prism 52 and a second corner cube prism 54, respectively. In the instant embodiment, the polarizing beam splitter 46 and the mirror 48 constitute the optical sensor head portion 102.

Referring next to FIGS. 2-5, there will be described in detail an operation of the instant optical fiber sensor. For easier understanding, the measuring beam is denoted by reference characters 1b in FIGS. 2-5 and the following figures, and transmitted as the mode $HE_{11}{}^x$ through the optical fiber 24, while the reference beam is denoted by reference characters 1a and transmitted as the mode $HE_{11}{}^y$ through the optical fiber 24.

Figure 2:
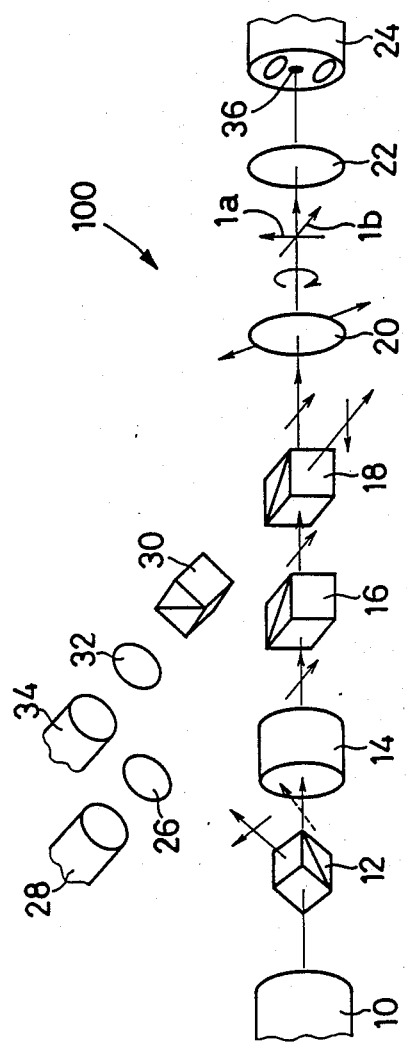

As indicated in FIG. 2, a part of the linearly polarized laser beam produced by the laser source 10 is reflected by the polarizing beam splitter 12 and thereby externally radiated, but the part of the laser beam whose polarization plane is perpendicular to that of the reflected part is propagated through the beam splitter 12. Dashed line with arrow head in FIG. 2 indicates the plane of polarization of the linearly polarized beam which has been propagated through the beam splitter 12. This linearly polarized beam is passed through the Faraday effect element 14, whereby the plane of polarization of the beam is rotated by 45° in the clockwise direction as viewed in the direction of propagation of the beam. Then, the beam is transmitted through the polarizing beam splitter 16 and the non-polarizing beam splitter 18, and is converted into the circularly polarized beam by the ¼ wave plate 20. The circularly polarized beam is incident upon the core 36 of the optical fiber 24. Since the circularly polarized beam is equivalent to the two linearly polarized beams having the mutually perpendicular polarization planes and angular phase difference of $\pi/2$ (90°), the circularly polarized beam is transmitted through the optical fiber 24, as the two modes $HE_{11}{}^x$ and $HE_{11}{}^y$ which have a phase difference of 90° and which function as the measuring and reference beams 1b, 1a, respectively. The part of the laser beam externally reflected by the non-polarizing beam splitter 18 is used for monitoring the output of the laser source 10.

Figure 3:
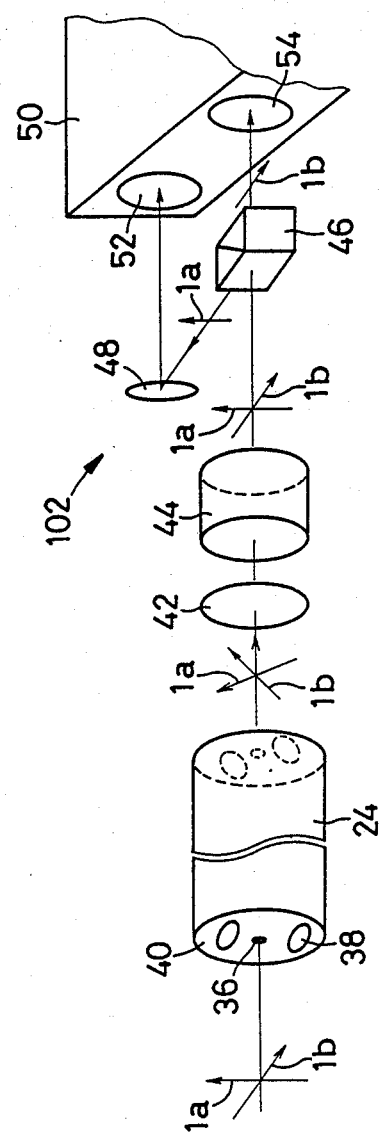

As shown in FIG. 3, the reference and measuring beams 1a, 1b emitted from the distal end of the optical fiber 24 are converged by the converging lens 42, and the polarization planes of the converged beams are rotated by 45° by the Faraday effect element 44. The reference and measuring beams 1a, 1b are then separated from each other by the polarizing beam splitter 46, and directed parallel to each other, toward the first and second corner cube prisms 52, 54.

The reference and measuring beams 1a, 1b reflected by the first and second corner cube prisms 52, 54 are guided back to the beam splitters 18, 16, travelling along the optical path along which the beams have been guided to the prisms 52, 54. However, the planes of polarization of the reflected beams 1a, 1b from the prisms 52, 54 are rotated by 180° with respect to those before the beams have been reflected Consequently, after the polarization planes of the reflected beams 1a, 1b have been rotated by 45° by the Faraday effect element 44, the polarization planes of the reflected beams 1a, 1b are rotated by 45° with respect to those of the incoming beams that were emitted from the distal end of the optical fiber 24 toward the element 44, as indicated in FIG. 4. As a result, the reflected reference and measuring beams 1a, 1b are transmitted backward through the optical fiber 24, in the modes $HE_{11}{}^x$ and $HE_{11}{}^y$, respectively, whereby the relationship between the beams 1a, 1b and the modes $HE_{11}{}^x$, $HE_{11}{}^y$ during the backward propagation of the reflected beams 1a, 1b toward the beam splitters 18, 16 is reversed with respect to that during the frontward propagation of the beams toward the prisms 52, 54.

The reflected reference and measuring beams 1a, 1b emitted from the proximal end of the optical fiber 24 are converted into parallel rays by the converging lens 22, and converted by the ¼ wave plate 20 into the clockwise-rotated and counterclockwise-rotated circularly polarized beams, as indicated in FIG. 5. Since the reference and measuring beams 1a and 1b have substantially the same amplitude, the mutually interfering clockwise-rotated and counterclockwise-rotated circularly polarized beams combine into a linearly polarized beam whose polarization plane is determined by a phase difference between the reference and measuring beams 1a, 1b. If the phase difference is equal to $2\pi$, for example, the polarization plane of the linearly polarized beam is rotated by 360°. The thus obtained linearly polarized beam is split by the non-polarizing beam splitter 18, into two components which are incident upon the first and second photosensors 28, 34, through the respective polarizing beam splitters 16, 30 which are positioned with a polarization plane deviation of 45° about the optical axis.

Electrical outputs of the photosensors 28, 34 are applied to a phase difference detecting circuit 56 as shown in FIG. 1, to detect an amount of change in the phase difference represented by the received outputs of the photosensors 28, 34. This change in the phase difference is caused by a difference between the lengths of the optical paths of the reference and measuring beams 1a, 1b from the sensor head portion 102 to the prisms 52, 54 disposed on a surface of a subject 50. Due to the difference of the optical path lengths indicated above, the transmission parameters (phases) of the reference and measuring beams 1a, 1b reflected by the prisms 52, 54 are changed by different amounts, and the outputs of the first and second photosensors 28, 34 represent the amounts of changes of the parameters of the beams 1a, 1b, which are compared with each other by the phase difference detecting circuit 56. If the subject 50 is rotated by a given angle in a plane parallel to the plane which includes the optical axes of the beams 1a, 1b incident upon or reflected from the first and second corner cube prisms 52, 54, the lengths of the optical paths of the beams 1a, 1b indicated above are accordingly changed, whereby the phase difference between the reference and measuring beams 1a, 1b is changed according to the angle of rotation of the subject 50. Thus, an output of the phase difference detecting circuit 56 accurately represents the angle of rotation of the subject 50.

In the instant optical fiber sensor, the optical axes of the reference and measuring beams travelling through the fixed-polarization-plane optical fiber 24 are coupled to each other, but do not interfere with each other since the polarization planes of the two beams are perpendicular to each other. Further, the influence of the temperature, strain, vibrations and other environmental factors of the optical fiber 24 on the transmission parameter (phase) of the reference beam 1a is counterbalanced by the influence of the same on the transmission parameter of the measuring beam 1b, since each of the reference and measuring beams 1a, 1b is transmitted through the optical fiber 24 in the direction toward the subject 50 as one of the two transmission modes, and in the backward direction toward the beam splitters 18, 16 as the other transmission mode, as described above by reference to FIGS. 3 and 4. In the absence of a difference between the influences of the environmental factors of the optical fiber 24 on the transmission parameters of the two beams 1a, 1b, a detected change in the phase difference between the two beams 1a, 1b reflects only a difference between the amounts of displacement of the first and second corner cube prisms 52, 54, i.e., accurately represents the angle of rotation of the subject 50.

In the instant optical fiber sensor of the optical homodyning type using the monochrome light source, the initial phase difference between the reference and measuring beams at the light transmitter/receiver portion 100 can be set at $\pi/2$ at which the phase difference is most responsive to a change in the rotating angle of the subject 50. This setting of the initial phase difference can be achieved by adjusting the angular position of the ¼ wave plate 20 about the optical axis. Thus, the instant sensor does not require an piezoelectric element to mechanically stress the sensor head portion 102 so as to establish a phase difference of $\pi/2$ between the reference and measuring beams. Hence, the instant sensor does not require means for applying electric power to such a piezoelectric element, or eliminates the otherwise required means for controlling the wavelength of the beam produced by the light source 10. Since the transmitter/receiver portion 100 and the sensor head portion 102 are optically connected by the single optical fiber 24, the sensor can be designed compact and small-sized and consequently easily incorporated in a suitable precision measuring, machining or processing, or testing or inspection device. Further, the instant sensor is available at an accordingly reduced cost.

The present optical fiber sensor may be used to detect the straightness of a surface plate 58, by using a movable subject 50 having the first and second corner cube prisms 52, 54. In this case, the subject 50 is moved from left side to right side of FIG. 6, while the reference and measuring beams 1a, 1b are incident upon and reflected by the prisms 52, 54. In this case, the output of the phase difference detecting circuit 56 represents a phase difference indicative of the out-of-straightness of the surface of the surface plate 58.

Figure 7:
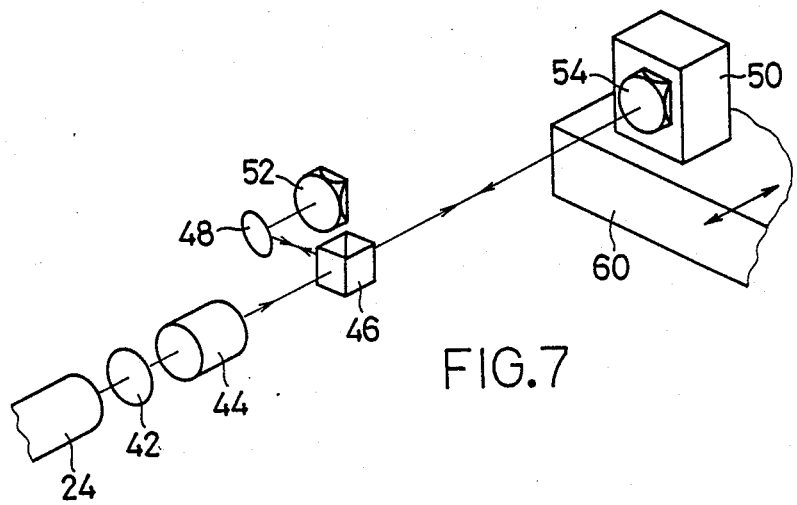

The instant optical fiber sensor may be modified to detect an amount of linear movement of a subject. For instance, if the first corner cube prism 52 is secured on the sensor head portion 102 while the second corner cube prism 54 is fixed on a surface of a movable table 60, as indicated in FIG. 7, the amount of linear displacement of the table 60 can be accurately detected based on an amount of change in the phase difference represented by the output signal of the phase difference detecting circuit 56.

Further, the distance between the sensor head portion 102 and the second corner cube prism 54 on the table 60 can be measured by providing the transmitter/receiver portion 100 with a directly-modulatable semiconductor laser, and measuring the frequency of interference fringes formed by triangular-wave modulation of the laser beam produced by the semi-conductor laser.

Figure 8:
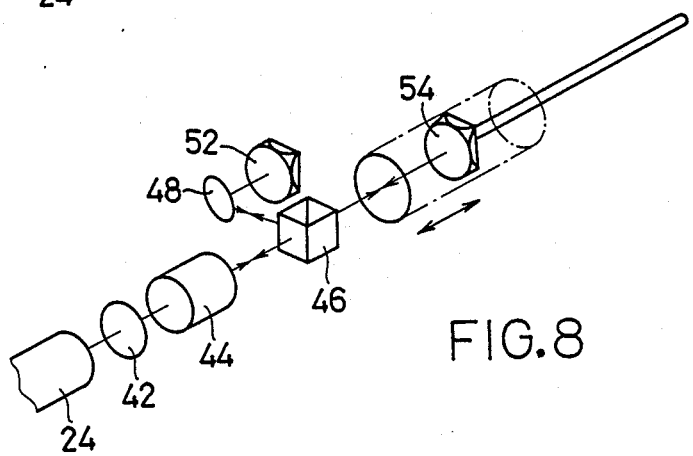

If the second corner cube prism 54 is fixed on a movable member of a length measuring device of the contact type such as a slide caliper or micrometer, as illustrated in FIG. 8, lengths can be measured based on the phase difference detected by the detecting circuit 56.

While the polarizing beam splitter 12, Faraday effect element 14 and polarizing beam splitter 16 function as an optical isolator as described above, the polarizing beam splitter 12 and the Faraday effect element 14 may be eliminated if the light source 10 employs a light-emitting diode (LED) or a super-luminescent diode (SLD) which is less likely to be influenced by a reflected light beam. Where a He-Ne laser is used together with a ultrasonic modulator whose frequency is 2 GHz, the optical isolator indicated above may be eliminated, since the frequency of the reflected beam falls outside the gain band of the He-Ne laser. When a semi-conductor laser or other directly modulatable light source is used, the optical isolator may be eliminated by switching off the light source while the reflected beam is incident upon the light source, by utilizing a propagation time delay of the optical fiber 24.

Modified arrangements of the light transmitter/receiver portion 100 will be described by reference to FIG. 9 and the following figures, wherein the same reference numerals as used in the preceding figures will be used to identify the corresponding components. Redundant description of these components will not be provided.

Figure 9:
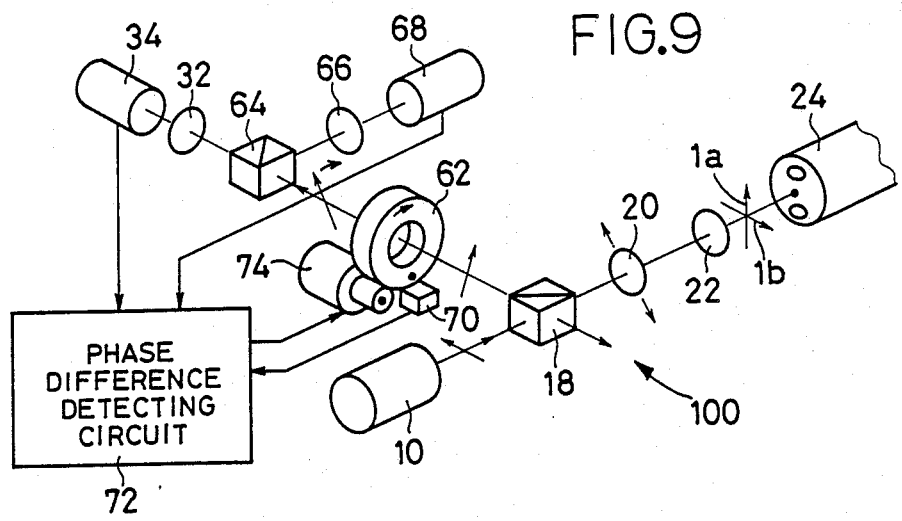
FIGS. 9, 11, 12, 13, 14 and 15 are views showing light transmitter/receiver portions of other embodiments of the invention, respectively.
Figure 10:
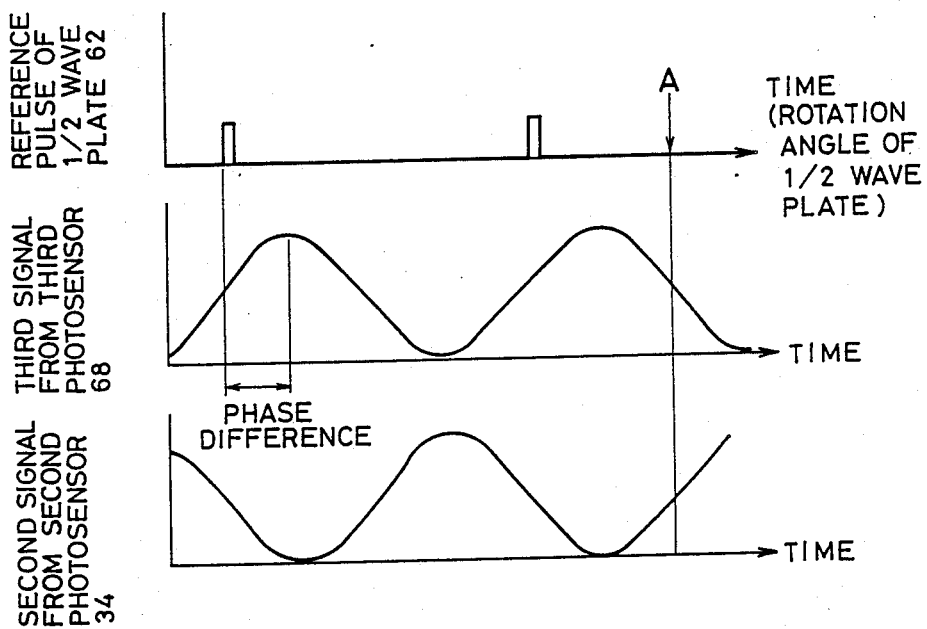
FIG. 10 is a view explaining an operation of the embodiment of FIG. 9.

Referring to FIG. 9, there is shown an example of a modified arrangement of the transmitter/receiver portion 100, wherein a ½ wave plate is used as a modulator or a bias adjusting element. This modified transmitter/receiver portion 100 may be used with the sensor head portion 102 which has been described above. In the instant arrangement, a monochrome laser beam produced by the laser source 10 and transmitted through the non-polarizing beam splitter 18 is passed through the ¼ wave plate 20, whereby the incident laser beam is substantially converted into linearly polarized beams 1a, 1b whose polarization planes are perpendicular to each other. These linearly polarized beams 1a, 1b are transmitted through the transmission optical fiber 24, as the two transmission modes as previously discussed. The beams 1a, 1b reflected by the subject are transmitted back toward the transmitter/receiver portion 100, as the two transmission modes whose relationship with the beams 1a, 1b is reversed to that in the transmission from the transmitter/receiver portion 100 toward the subject. With the reflected beams 1a, 1b propagated through the ¼ wave plate 20, the beams 1a, 1b are converted into a linearly polarized beam whose polarization plane has been rotated in relation to a phase difference between the beams 1a, 1b. The instant arrangement uses a ½ wave plate 62, which is rotated by a rotary motor at a frequency fo, for rotating the plane of polarization of the linearly polarized beam about the optical axis, after the beam is reflected by the non-polarizing beam splitter 18. With the linearly polarized beam transmitted through the ½ wave plate 62, the polarization plane is rotated at a frequency of 2 x fo. In this case, the ½ wave plate 62 functions as an optical frequency shifter, and may be replaced by an optical frequency shifter which uses a crystal of ZnS or LiNO$_3$. The obtained linearly polarized beam thus rotated by the ½ wave plate 62 is splitted by a polarizing beam splitter 64 into two components, one of which is received by the second photosensor 34 via the converging lens 32, and the other of which is received by a third photosensor 68 via a converging lens 66. As a result, a sinusoidal wave signal having a frequency of 2 x fo is obtained in a phase difference detecting circuit 72. The phase of the sinusoidal wave signal is compared with that of a reference pulse wave generated by a rotation sensor 70 which detects a reference angular position of the ½ wave plate 62. In this manner, the detecting circuit 72 detects the phase difference between the linearly polarized beams 1a, 1b whose polarization planes are perpendicular to each other.

Where it is desired to measure vibrations of the subject 50 whose wavelength is smaller than that of the measuring beam, the angular position of the ½ wave plate 62 is adjusted to position "A" indicated in FIG. 10, in order to establish the initial phase difference of $\pi/2$ between the reference and measuring beams 1a, 1b, at which a change in the phase difference is most responsive to a change on the subject 50. To this end, the phase difference detecting circuit 72 is adapted to also perform a function of controlling a drive motor 74 for adjusting the reference angular position of the ½ wave plate 62 such that a DC component of the second signal from the second photosensor 34 is equal to a DC component of the third signal from the third photosensor 68. In establishing the angular position of the ½ wave plate 62, the plate 62 is rotated usually at several hundreds of Hz, and the rotation of the plate 62 cannot follow a high velocity motion of the subject 50. Suppose the wavelength of the measuring beam 1b is 633 nm while the rotation frequency of the ½ wave plate 62 is 200 Hz, the rotation of the plate 62 cannot follow a motion at a velocity of 0.24 mm/s or higher. Although the surface roughness of the subject 50 may be measured with sufficiently high accuracy, at the rotation frequency of 200 Hz of the ½ wave plate 62, this arrangement cannot be used for positioning a table of a machine tool. However, this positioning may be achieved by using an optical frequency shifter utilizing an electro-optic effect, in place of the ½ wave plate 62 of FIG. 9. In this case, the frequency shifter is capable of effecting modulation of several hundreds of MHz.

Figure 11:
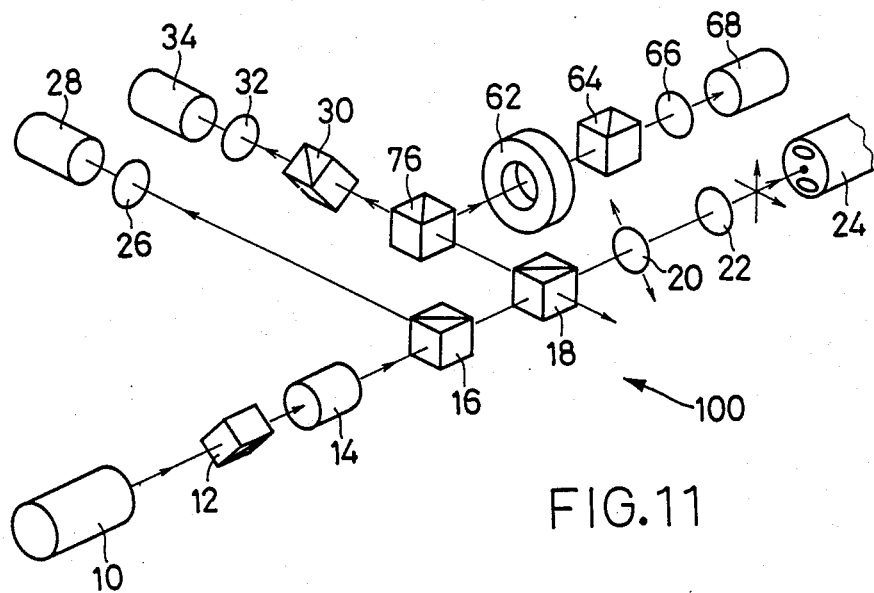

Referring to FIG. 11, there is shown an arrangement which permits selectively practicing one of the two phase difference detecting methods of FIGS. 1 and 9, depending upon the desired degree of detecting resolution. Described in more detail, the component of the beam reflected by the non-polarizing beam splitter 18 toward the second photosensor 34 is split by another non-polarizing beam splitter 76 into two parts, one of which is received by the second photosensor 34 via the polarizing beam splitter 30 and converging lens 32, and the other of which is received by the third photosensor 68 via the $\frac{1}{2}$ wave plate 62, polarizing beam splitter 64 and converging lens 66. When the desired detecting resolution is lower than that corresponding to the wavelength of the measuring beam 1$b$, the detection of the phase difference is effected based on the output signals of the first and second photosensors 28, 34 as in the embodiment of FIG. 1. When the desired detecting resolution is higher than that corresponding to the wavelength of the measuring beam 1$b$, then the detection is performed based on the output signals of the second and third photosensors 34, 68 as in the embodiment of FIG. 9.

Figure 12:
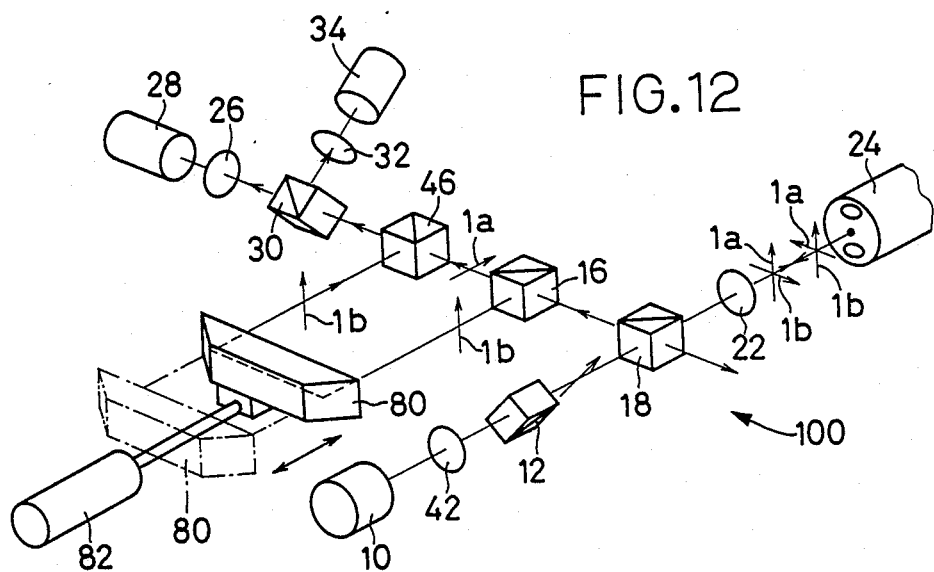

In a further embodiment of the invention shown in FIG. 12, the polarizing beam splitter 12 is oriented in inclined relation with respect to the optical axis. The laser beam emitted by the laser source 10 is linearly polarized by the polarizing beam splitter 12 such that the polarization plane of the polarized beam is inclined 45° with respect to the optical axis. The thus obtained linearly polarized beam is incident upon the end face of the fixed-polarization-plane optical fiber 24 via the non-polarizing beam splitter 18 and converging lens 22. When the linearly polarized beam falls on the end face of the optical fiber 24, such that the polarization plane of the incident beam is inclined 45° with respect to the horizontal axis of the optical fiber 24, the incident beam is converted into the reference and measuring beams 1$a$, 1$b$, which are propagated through the optical fiber 24 as the two transmission modes, and the beams 1$a$, 1$b$ reflected by the subject 50 are transmitted back through the optical fiber 24 toward the beam splitter 18. The beams 1$a$, 1$b$ reflected by the beam splitter 18 are incident upon the polarizing beam splitter 16, whereby the reference beam 1$a$ having the horizontal polarization plane is transmitted through the beam splitter 16 while the measuring beam 1$b$ having the vertical polarization plane is reflected by the beam splitter 16. The reference beam 1$a$ is passed through the polarizing beam splitter 46, while the measuring beam 1$b$ is reflected by a roof prism 80, whereby there is formed a phase difference between the measuring and reference beams 1$b$, 1$a$. The measuring beam 1$b$ is then reflected by the polarizing beam splitter 46, and is thus combined with the reference beam 1$a$. The combined beams are split by the polarizing beam splitter 30 into the two parts which are received by the first and second photosensors 28, 34.

In the present embodiment of FIG. 12, the phase difference detecting circuit (not shown) also performs a function of controlling an actuator 82 so as to position the roof prism 80 such that DC components of the output signals of the first and second photosensors 28, 34 are equalized. By suitably positioning the roof prism 80, the initial phase difference between the reference and measuring beams 1$a$, 1$b$ can be set to $\pi/2$, at which the phase difference is changed to a considerably large extent in relation to a vibration of the subject 50 having an extremely high frequency corresponding to the wavelength of the measuring beam 1$b$ or shorter. Further, if the laser source 10 is constituted by a super-luminescent diode (SLD) or similar element capable of producing a laser radiation having a low degree of coherence, the distance between the sensor head portion 102 and the subject 50 may be measured by positioning the roof prism 80 such that the interference between the reference and measuring beams 1$a$, 1$b$ is maximum (such that the phase difference is zero). In this case, the resolution of measurement of the distance is several millimeters, if the super-luminescent diode is used as the laser source 10. In the present embodiment, the roof prism 80 and the actuator 82 constitute means for adjusting the initial phase difference between the reference and measuring beams 1$a$, 1$b$.

Figure 13:
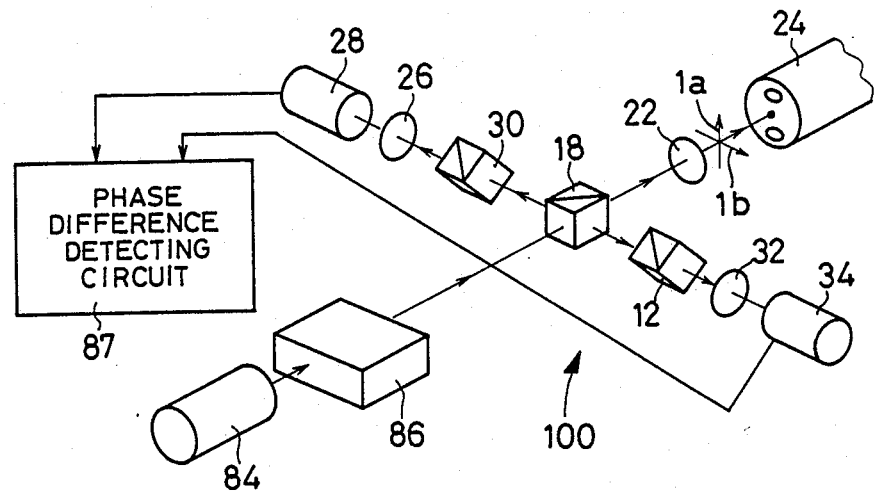

In a further embodiment illustrated in FIG. 13, a change in the phase difference is detected at the transmitter/receiver portion 100, in the frequency-modulation method (optical heterodyning method). More specifically, the instant embodiment employs a laser source 84 in the form of a He-Ne laser of the horizontal Zeeman type capable of producing two linearly polarized beams whose frequencies are slightly different from each other and less likely to fluctuate, and whose polarization planes are perpendicular to each other. The linearly polarized beams are modulated by an acousto-optic modulator 86, and split by the non-polarizing beam splitter 18 into two components, one of which is received by the second photosensor 34 via the polarizing beam splitter 12 and converging lens 32. This second photosensor 34 produces a reference beat signal indicative of a beat frequency which arises from a difference in the frequency between the reference and measuring beams 1$a$, 1$b$. On the other hand, the linearly polarized beam propagated through the non-polarizing beam splitter 18 is incident upon the optical fiber 24 through the $\frac{1}{4}$ wave plate 20 and converging lens 22, as the reference and measuring beams 1$a$, 1$b$. As in the preceding embodiments, the reference and measuring beams 1$a$, 1$b$ reflected by the subject 50 and transmitted through the optical fiber 24 back toward the beam splitter 18 are reflected by the beam splitter 18 and received by the first photosensor 28 through the beam splitter 30 and converging lens 26. This first photosensor 28 produces a measuring beat signal indicative of a beat frequency which arises from a difference in the frequency between the linearly polarized reference and measuring beams 1$a$, 1$b$ which have been received. A phase difference between the reference beat signal and the measuring beat signal is detected by a phase difference detecting circuit 87. The detected phase difference represents a change in the transmission parameter included in the measuring beam 1$b$ which is influenced by a change on the subject 50. In this embodiment, the optical frequency modulator 86 serves as an optical isolator.

Figure 14:
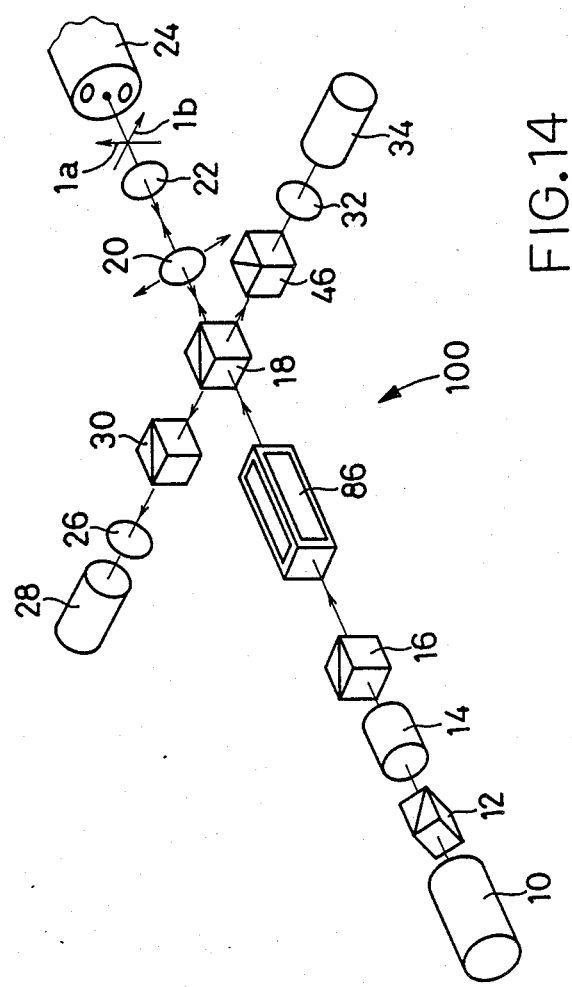

In a yet further embodiment of the present invention illustrated in FIG. 14, the monochrome laser beam produced by the laser source 10 is transmitted through the polarizing beam splitter 12, Faraday effect element 14, polarizing beam splitter 16 and optical frequency modulator 86, which serve as an optical isolator. The laser beam is then split by the non-polarizing beam splitter 18. The optical frequency modulator 86 may be constituted by $\frac{1}{2}$ wave plate which is adapted to be rotatable about the optical axis. Suppose the drive frequency of the optical frequency modulator 86 is fo, the modulator 86 produces a linearly polarized beam whose polarization plane is rotated at a frequency of 2 x fo. One of the components of the beam which has been reflected by the beam splitter 18 is received by the second photosensor 34 via the beam splitter 46 and converging lens 32, while the other component is transmitted through the beam splitter 18 and ¼ wave plate 20. Since the polarization plane of the linearly polarized beam incident upon the ¼ wave plate 20 is rotated at the frequency of 2 x fo, this beam is converted by the ¼ wave plate 20 into the reference and measuring beams 1a, 1b whose polarization planes are perpendicular to each other and whose frequencies are different from each other by 2 x fo. As in the preceding embodiments, the reference and measuring beams 1a, 1b are transmitted toward the subject 50 through the optical fiber 24 as the transmission modes $HE_{11}{}^y$ and $HE_{11}{}^x$, respectively, and returned from the subject 50 through the optical fiber 24 as the $HE_{11}{}^x$ and $HE_{11}{}^y$, respectively. The returned reference and measuring beams 1a, 1b are reflected by the non-polarizing beam splitter 18, and received by the first photosensor 28 via the polarizing beam splitter 30 and converging lens 26. In this embodiment, too, a phase difference detecting circuit receives a reference beat signal from the second photosensor 34, and a measuring beat signal from the first photosensor 28, to produce an output indicative of a phase difference between the reference and measuring beat signals, which represents a change in the phase of the measuring beam 1b that is caused by a change on the subject 50.

Figure 15:
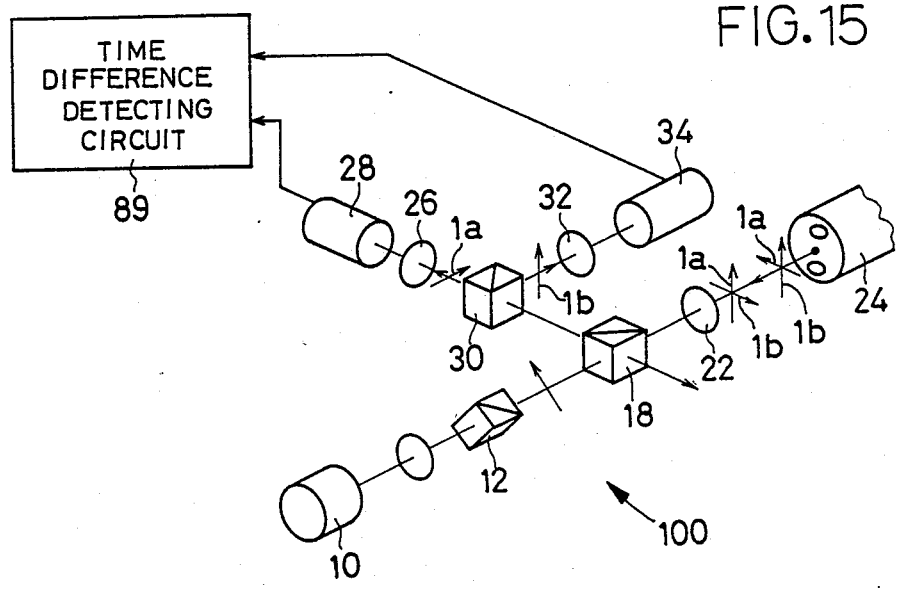

A still further embodiment of the present invention is illustrated in FIG. 15, wherein the laser source 10 such as a semi-conductor laser is pulse-driven, and the monochrome laser beam emitted by the laser source 10 is incident upon the fixed-polarization-plane optical fiber 24, through the 45°-inclined polarizing beam splitter 12, non-polarizing beam splitter 18 and converging lens 22. The beam incident upon the optical fiber 24 has two components having the vertical and horizontal polarization planes 1a, 1b, and the two components are transmitted through the optical fibers 24 as the respective two transmission modes $HE_{11}{}^y$ and $HE_{11}{}^x$ whose polarization planes are perpendicular to each other. The reference and measuring beams 1a, 1b reflected by the subject 50 are returned through the optical fiber 24 as the two modes $HE_{11}{}^x$ and $HE_{11}{}^y$, respectively, and are reflected by the non-polarizing beam splitter 18. Then, the beams are split by the polarizing beam splitter 30, so that the reference beam 1a is incident upon the first photosensor 28, while the measuring beam 1b is incident upon the second photosensor 34. In the present embodiment, a time difference detecting circuit 89 receives the outputs of the first and second photosensors 28, 34, in order to detect a difference in the transmission time between the reference and measuring beams 1a, 1b. If the sensor head portion 102 is constructed as shown in FIG. 7, for example, the distance between the first corner cube prism 52 secured on the sensor head portion 102 and the second corner cube prism 54 secured on the movable table 60 may be measured based on the detected transmission time difference.

There will next be described modified arrangement of the optical sensor head portion 102.

Figure 16:
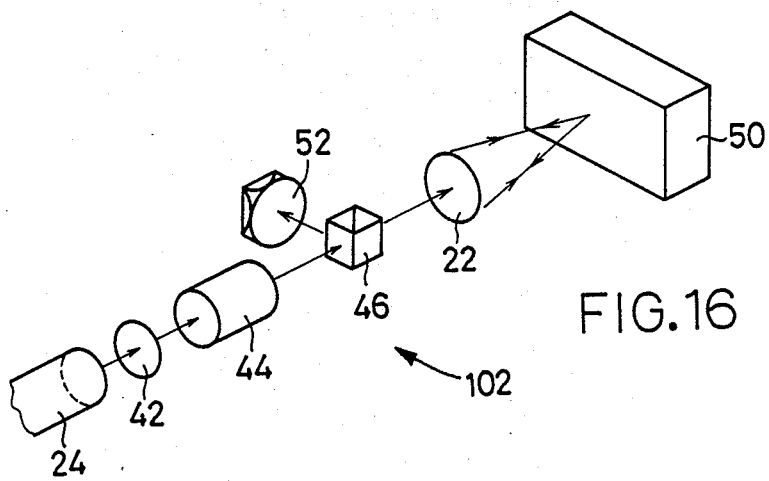
FIGS. 16, 17, 18, 19, 20 and 21 are views optical sensing heads of further embodiments of the invention, respectively.

In the arrangement of FIG. 16, the reference and measuring beams as the two different transmission modes emitted from the optical fiber 24 are converted into parallel rays of light by the converging lens 42, and the polarization planes of the beams are rotated by the Faraday effect element 44 by 45°. Then, the reference and measuring beams are separated from each other by the polarizing beam splitter 46, so that the reference beam is incident upon the first corner cube prism 52 secured on the sensor head portion 102, while the measuring beam is converged on a surface of the subject 50. Since the phase difference between the reference and measuring beams is changed depending upon the surface roughness of the subject 50, the surface roughness can be measured based on the detected change in the phase difference. Since the amount of change in the height or depth of the projections and indentations on the surface to be measured is extremely small, the instant sensor head portion 102 is suitably used in combination with the light transmitter/receiver portion 100 shown in FIG. 9.

Figure 17:
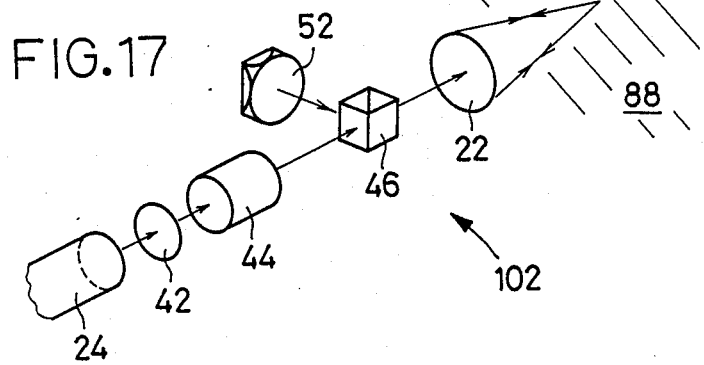

In the arrangement of FIG. 17, the subject 50 of FIG. 16 is replaced by a stream of fluid 88. Namely, the velocity of a flow of the fluid 88 is measured based on the fact that the phase difference between the measuring and reference beams is changed in relation to the velocity of the fluid flow. If the instant sensor head portion 102 is used with the transmitter/receiver portion 100 as shown in FIG. 13 or 14, a precision laser Doppler velocimeter may be provided for accurately determining the velocity of a fluid flow from the Doppler shift in the frequency of a laser beam scattered from particles in the fluid.

Figure 18:
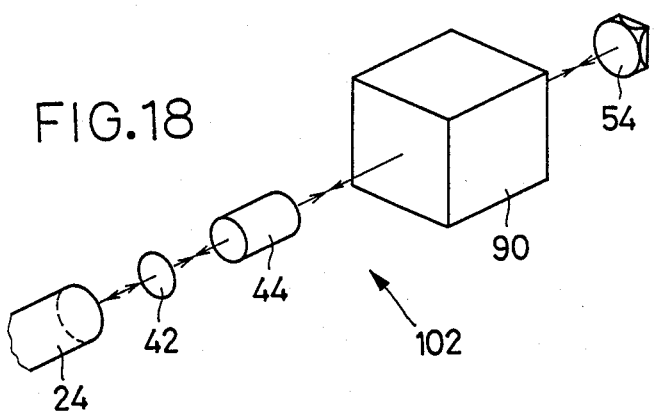
Figure 19:
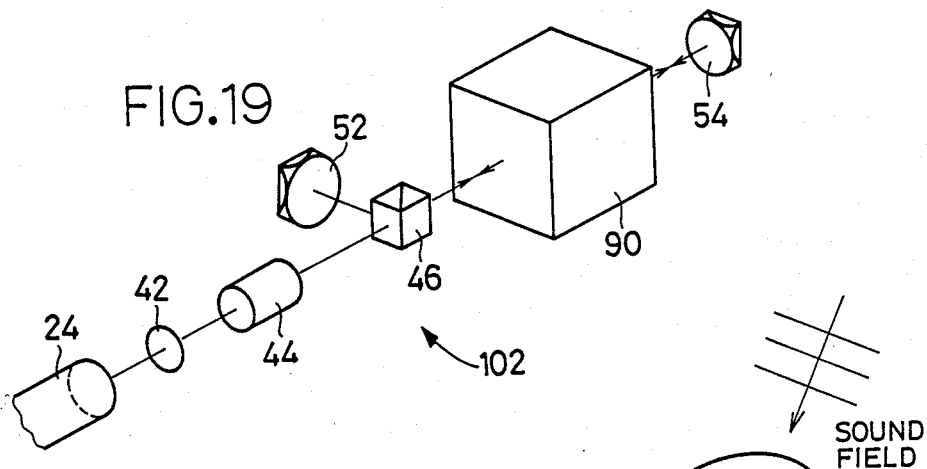

In the arrangement of FIG. 18, the reference and measuring beams are propagated through a subject 90 whose refractive index is changed. In the arrangement of FIG. 19, the reference beam is reflected by the first corner cube prism 52, while the measuring beam is transmitted through the subject 90 and is reflected by the second corner cube prism 54 so that the reflected measuring beam is returned through the subject 90. That is, only the measuring beam is transmitted through the subject 90 in the opposite directions. In these two arrangements, the phase difference of the measuring beam with respect to the reference beam is changed in relation to the refractive index of the subject 90, whereby a change in the refractive index of the subject 90 may be measured. These arrangements may be utilized for measuring various parameters of desired subjects, other than the refractive index. If the subject 90 consists of a Pockel cell or Pockels effect crystal such as $LiNbO_3$ or $LiTaO_3$ capable of changing the refractive index in relation to an electric field or voltage applied thereto, the electric field strength or voltage may be measured. If the subject 90 consists of a substance such as $LiNbO_3$ whose index of double refractive is changed with temperature, the temperature of the subject 90 may be measured. If the subject 90 consists of a substance such as Pyrex glass or quartz glass which exhibits a photoelastic effect, the pressure, vibration or acceleration of the subject may be measured. If the subject 90 consists of a transparent container containing a gas, the concentration of the gas may be measured. In this case, the beam incident upon the subject 90 does not undergo double refraction, and therefore the sensor head portion 102 shown in FIG. 19 may be suitably employed.

Figure 20:
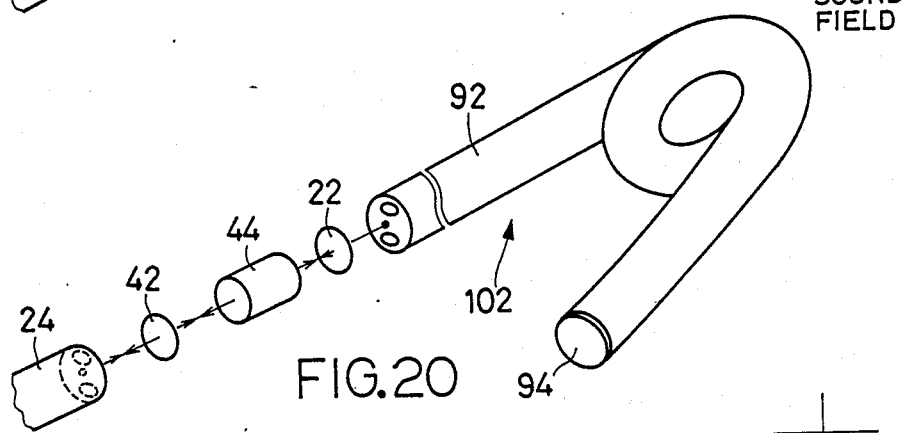

In the arrangement of FIG. 20, the sensor head portion 102 consists of a fixed-polarization-plane optical fiber 92 which, like the transmission optical fiber 24, transmit the two modes $HE_{11}{}^y$, $HE_{11}{}^x$ whose polarization planes are perpendicular to each other. The free end face of the sensor head optical fiber 92 is covered by a reflector film 94. The reference and measuring beams emitted from the transmission optical fiber 24 are incident upon the other end face of the sensor head optical fiber 92, through the converging lens 42, Faraday effect element 44 and converging lens 22. The reference and measuring beams are transmitted through the optical fiber 92 as the above-indicated two modes $HE_{11}{}^y$, $HE_{11}{}^x$ without a mutual interference, and are reflected by the reflector film 94, whereby the reflected beams are returned back toward the optical fiber 24. During this transmission toward the optical fiber 24, the phases of the reference and measuring beams are changed by a sound pressure of a sound field to which the optical fiber 92 is exposed. The reflected beams are returned through the optical fiber 24, as the two modes $HE_{11}{}^x$, $HE_{11}{}^y$, as in the preceding embodiments. Thus, a change in the transmission parameter of the measuring beam which arises from the sound pressure may be accurately determined based on a change in the phase difference between the reference and measuring beams as in the preceding embodiments. When the instant sensor head portion 102 is used in combination with the transmitter/receiver portion 100 shown in FIG. 9 or 12, the initial phase difference between the reference and measuring beams can be automatically adjusted for maximum sensitivity of the sensor.

Figure 21:
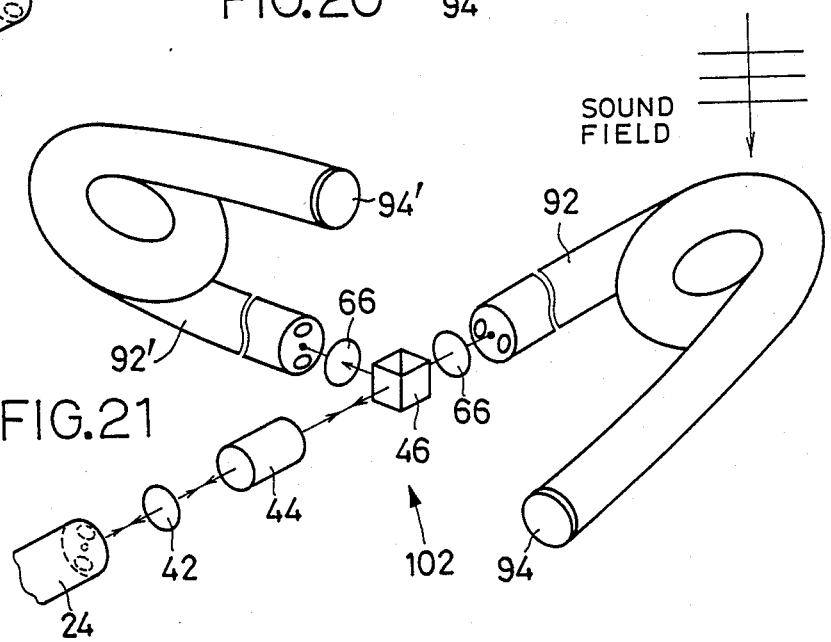

In the arrangement of FIG. 21, the reference and measuring beams are separated from each other by the beam splitter 46, so that the reference beam is incident upon a fixed-polarization-plane optical fiber 92' having a reflector film 94', which is similar to the optical fiber 92, while the measuring beam is incident upon the optical fiber 92, as described above. The reference beam reflected by the reflector film 94' is combined with the measuring beam reflected by the reflector film 94, at the beam splitter 46, and these reflected beams are transmitted through the optical fiber 24 back to the transmitter/receiver portion, as the two transmission modes $HE_{11}{}^x$, $HE_{11}{}^y$, respectively. As in the preceding arrangement, the sound pressure can be accurately measured by detecting a change in the phase difference between the two beams. In the instant arrangement, only the measuring beam is influenced by the sound pressure, and the measuring accuracy is accordingly improved.

Figure 22:
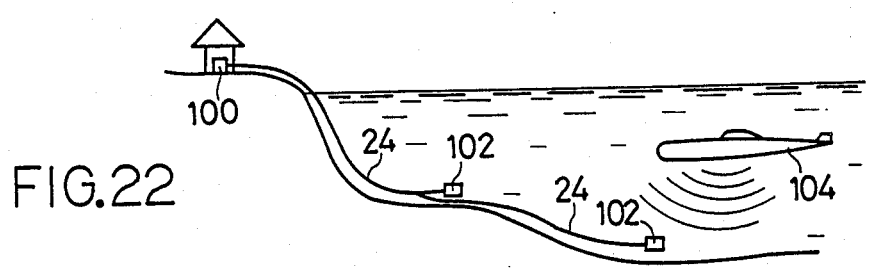
FIGS. 22, 23, 24 and 25 are illustrations showing different applications of the optical fiber sensor of the invention.
Figure 23:
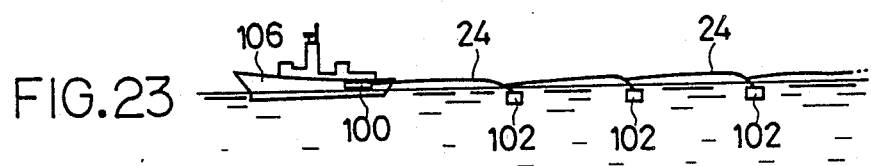
Figure 24:
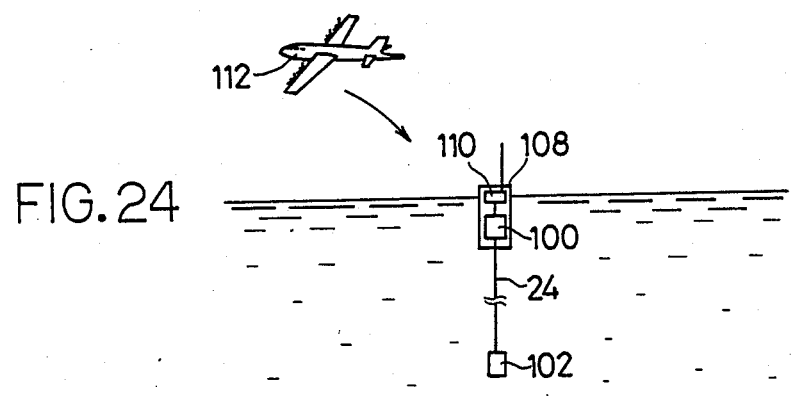
Figure 25:
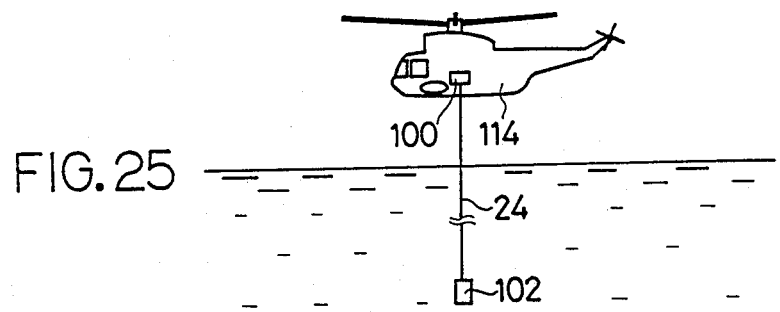
Figure 26:
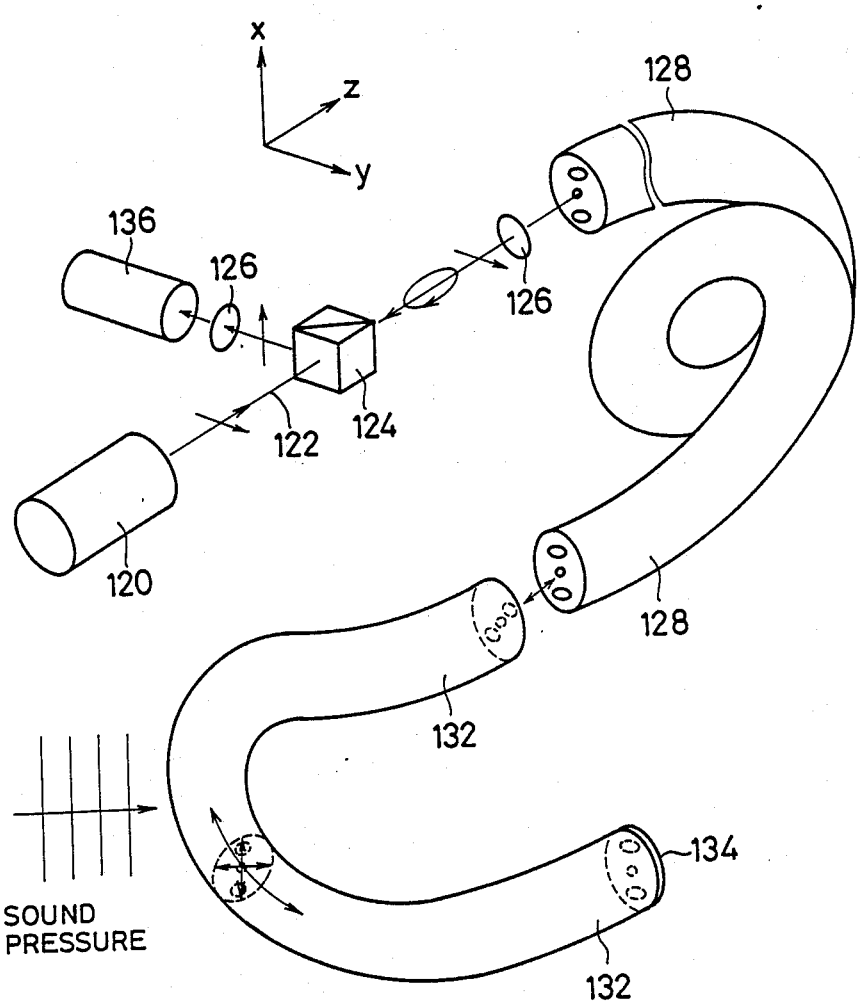
FIGS. 26 and 27 are views illustrating conventional optical fiber sensors.
Figure 27:
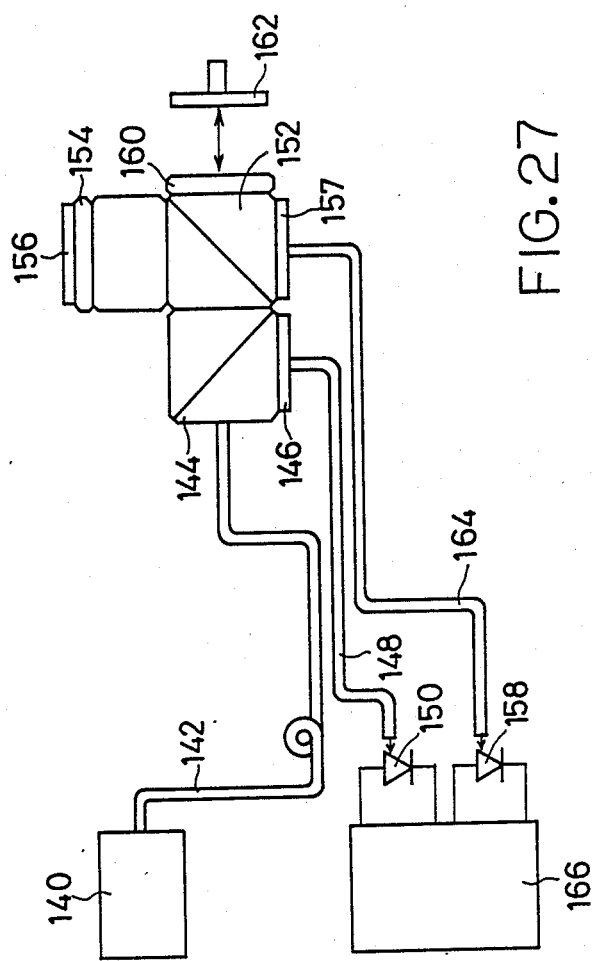

Some applications of the optical fiber sensor of the present invention will be described. In the example of FIG. 22, the transmitter/receiver portion 100 positioned on the land is optically connected to the sensor head portion 102 positioned on the bottom of the sea, by the transmission fixed-polarization-plane optical fiber 24. The instant optical fiber sensor is used to detect a sound wave produced by a ship 104 which moves on the surface of the water or within the water. In the example of FIG. 23, the transmitter/receiver portion 100 is fixed on a vessel 106 navigating on the surface of the water, and the sensor head portions 102 connected to the transmitter/receiver portion 100 by the optical fibers 24 are drawn by the vessel 106. In the example of FIG. 24, the sensor head portion 102 is suspended from a buoy 108 floating on the surface of the water, and is connected by the optical fiber 24 to the transmitter/receiver portion 100 disposed within the buoy 108. The output signal of the transmitter/receiver portion 100 is transmitted by a radio transmitter 110 also disposed within the buoy 108. The signal wave transmitted by the radio transmitter 110 is received by a receiver on an airplane 112 from which the buoy 108 is dropped with the optical fiber sensor, onto the surface of the water. In the example of FIG. 25, the sensor head portion 102 is suspended from a helicopter 114 and optically connected by the optical fiber 24 to the transmitter/receiver portion 100 disposed on the helicopter 114.

Figure 28:
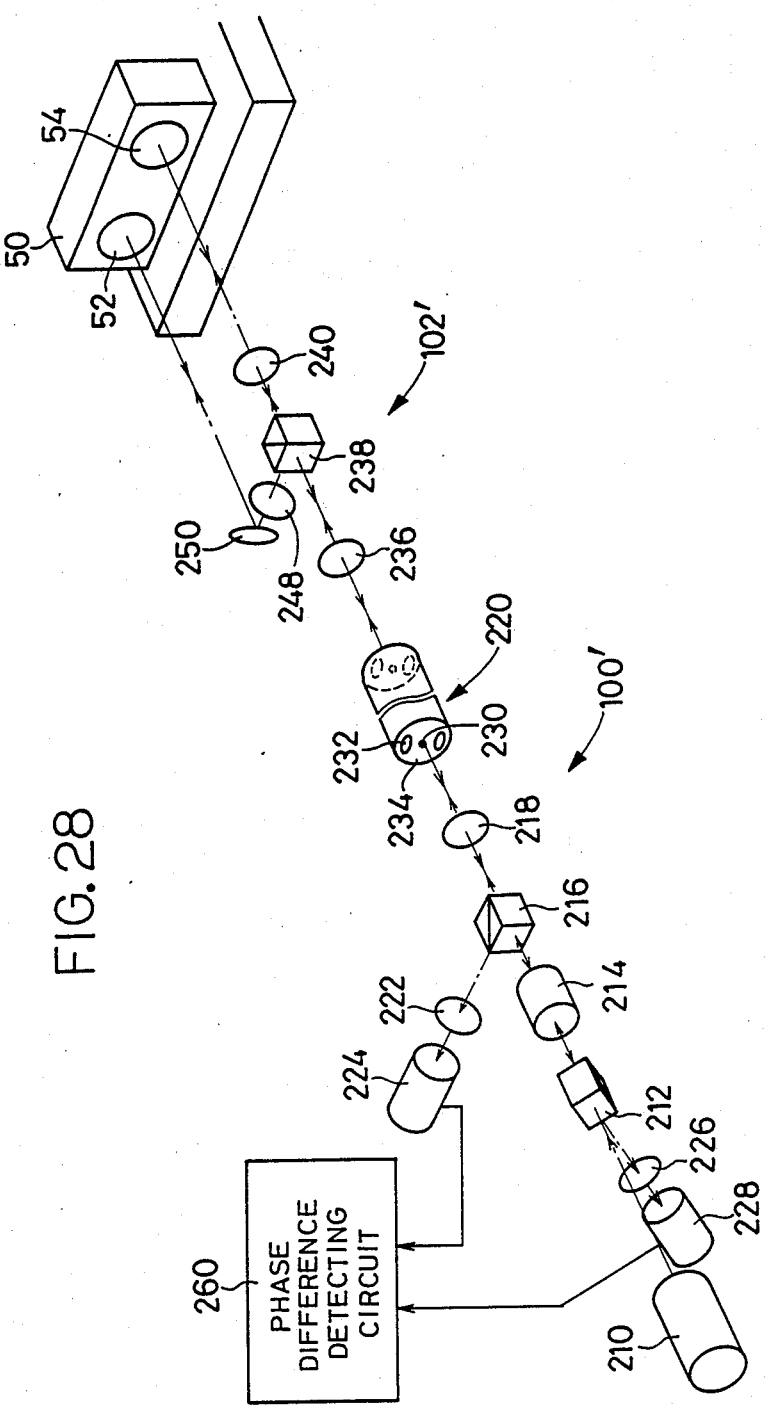
FIG. 28 is a schematic perspective view depicting a still further embodiment of the present invention.

Referring next to FIG. 28, there is illustrated a further embodiment of the invention in the form of an optical fiber sensor of the optical homodyning type.

In FIG. 28, a monochrome laser beam produced by a laser source 210 such as a He-Ne laser is passed through a polarizing beam splitter 212 rotated 45° about the optical axis, a Faraday effect element 214 and a polarizing beam splitter 216, and is converged by a converging lens 218 on the end face of a fixed-polarization plane optical fiber 220. The polarizing beam splitter 212, Faraday effect element 214, and polarizing beam splitter 216 serve as an optical isolator for protecting the laser source 210 from the reflected beams. The polarizing beam splitter 216 also functions to split the incident beam into two components whose polarization planes are perpendicular to each other. The light beam reflected by the beam splitter 216 is received by a first photosensor 224 via a converging lens 222. The light beam which is once transmitted through the beam splitter 216 in one direction toward the optical fiber 220 is returned as the reflected beam through the beam splitter 216 in the opposite direction, and incident upon the Faraday effect element 214 whereby the polarization plane of the reflected beam is rotated by 45° about the optical axis. Therefore, a component of the reflected beam is reflected by the polarizing beam splitter 212 and received by a second photosensor 228 via a converging lens 226. In the present embodiment, the elements (except the optical fiber 220) which have been described constitute light transmitter/receiver portion 100' of the optical fiber sensor. One end of the optical fiber 220 is fixed to a housing of the transmitter/receiver portion 100'.

The fixed-polarization-plane optical fiber 220 consists of a core 230, a pair of stressing portions 232, 232 sandwiching the core 230, and a clad 234 which covers the core and stressing portions 230, 232. The optical fiber 220 is capable of transmitting a polarized beam such that the polarization planes of the two modes $HE_{11}{}^x$ and $HE_{11}{}^y$ that are perpendicular to each other are maintained. Since the linearly polarized beam which has been transmitted through the beam splitter 216 is incident upon the proximal end face of the optical fiber 220, the incident beam is transmitted through the optical fiber 220, as one of the two transmission modes $HE_{11}{}^x$, $HE_{11}{}^y$.

The distal end of the optical fiber 220 is attached to a frame of an optical sensor head portion 102'. The linearly polarized beam transmitted through the optical fiber 220 as one of the two modes $HE_{11}{}^x$ and $HE_{11}{}^y$ is emitted from the distal end face of the fiber 220, and converted into parallel rays. The parallel rays are split-ted by a non-polarizing beam splitter 238 into a reference beam and a measuring beam. The measuring beam transmitted through the non-polarizing beam splitter 238 is transmitted through a $\frac{1}{4}$ wave plate 240. This $\frac{1}{4}$ wave plate 240 is capable of rotating the polarization plane of a linearly polarized beam by 45° after the beam is transmitted through the plate 240 two times in the opposite directions. The measuring beam transmitted through the $\frac{1}{4}$ wave plate 240 falls upon one of the first and second corner cube prisms 52, 54 on the subject 50, in this case, upon the second prism 54.

The reference beam reflected by the non-polarizing beam splitter 238 is transmitted through a $\frac{1}{8}$ wave plate 248 and reflected by a mirror 250 toward the other of the first and second prisms 52, 54, in this case, toward the first prism 52, in parallel to the direction of propagation of the measuring beam from the beam splitter 238 to the second prism 54. The ¼ wave plate 248 is capable of converting a linearly polarized light beam into a circularly polarized light beam after the linearly polarized beam is transmitted two times in the opposite directions. The first and second corner cube prisms 52, 54 are coated with a metallic layer, so that the polarization characteristics of the beams reflected by the prisms 52, 54 are not changed.

In the embodiment of FIG. 28, the non-polarizing beam splitter 238 and mirror 250 constitute a major part of the sensor head portion 102′, and the ¼ wave plate 240 and ⅛ wave plate 248 constitute means provided at the sensor head portion 102′, for adjusting the polarization planes and phases of the reference and measuring beams so that these beams are transmitted through the optical fiber 220 back toward the transmitter/receiver portion 101′, as the two transmission modes whose phases are shifted from each other by 90° and whose polarization planes are perpendicular to each other.

Figure 29:
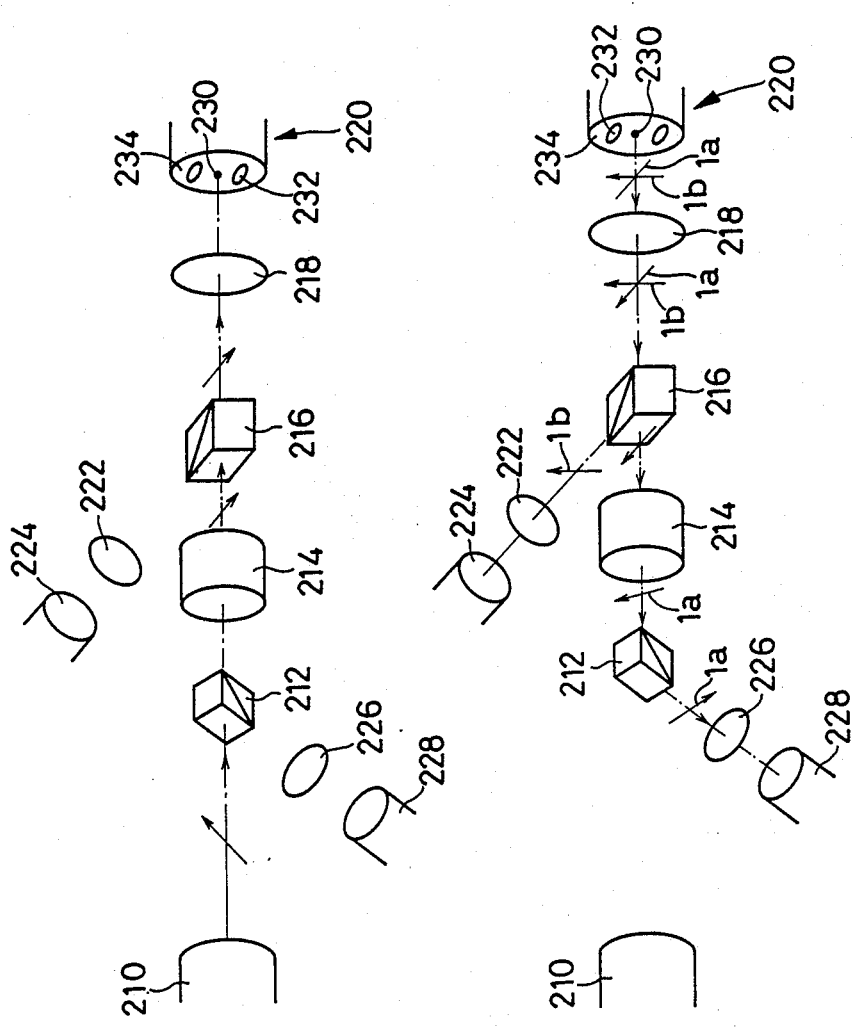

An operation of the instant optical fiber sensor of FIG. 28 will be described by reference to FIGS. 29 through 32. As shown in FIG. 29, the linearly polarized laser beam emitted from the laser source 210 is passed through the polarizing beam splitter 212. A short arrow in FIG. 29 that extends perpendicularly to the direction of propagation of the laser beam indicates the plane of polarization of the laser beam. The linearly polarized laser beam is then passed through the Faraday effect element 214, whereby the polarization plane of the beam is rotated 45° in the clockwise direction. The linearly polarized beam is transmitted through the polarizing beam splitter 216, and converged by the converging lens 218 so that the converged beam enters the core 230 of the optical fiber 220. The incident linearly polarized beam is transmitted through the optical fiber 220 as one of the two transmission modes $HE_{11}{}^x$, $HE_{11}{}^y$.

Figure 30:
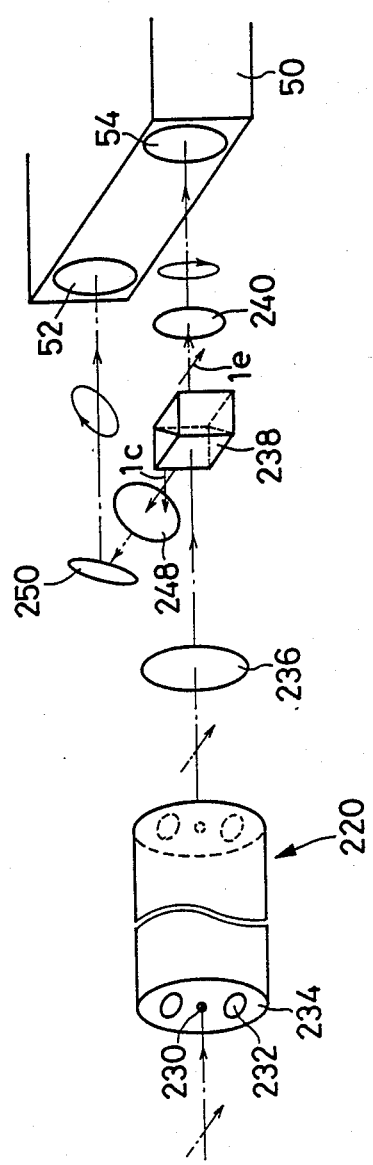

As shown in detail in FIG. 30, the laser beam emitted from the distal end of the optical fiber 220 is converted into parallel rays by the converging lens 236, and is split by the non-polarizing beam splitter 238 into two parts. This beam splitter 238 is required to divide the incident beam into two parts which not only have equal amounts of optical energy but also exhibit properties of a linearly polarized beam. Commercially available non-polarizing beam splitters generally satisfy these requirements. In the instant embodiment, the linearly polarized beam transmitted through the beam splitter 238 is used as a measuring beam denoted by reference characters 1e, while the linearly polarized beam reflected by the beam splitter 238 is used as a reference beam denoted by reference numeral 1c. The measuring beam 1e is elliptically polarized by the ¼ wave plate 240 whose crystal axis is inclined 22.5° with respect to the direction of polarization. The elliptically polarized measuring beam 1e is directed to the second corner cube prism 54. The reference beam 1c is elliptically polarized by the ⅛ wave plate 248, and reflected by the mirror 250 toward the first corner cube prism 52.

Figure 31:
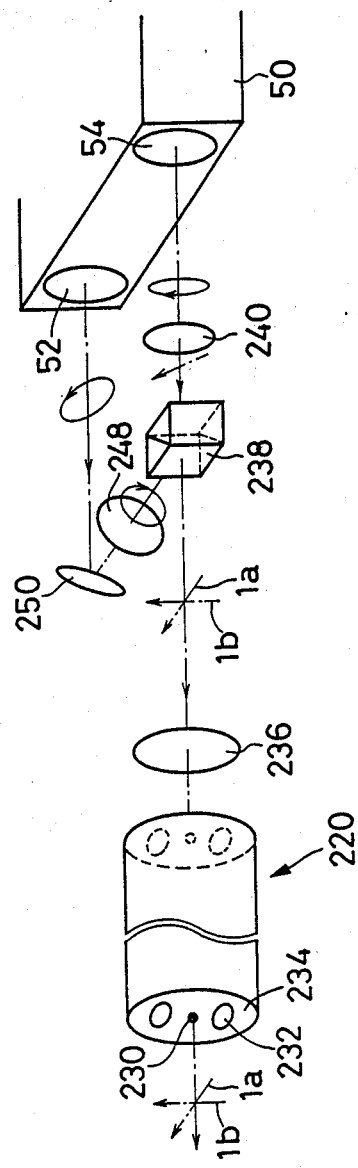

As shown in FIG. 31, the elliptically polarized measuring beam 1e reflected by the second corner cube prism 54 is again transmitted through the ¼ wave plate 240 and is thus linearly polarized. The polarization plane of this linearly polarized beam is inclined 45° with respect to that of the linearly polarized beam prior to the transmission through the ¼ wave plate 240 in the direction toward the prism 54. The elliptically polarized reference beam 1c reflected by the first corner cube prism 52 is circularly polarized as a result of transmission through the ⅛ wave plate 248. The above conversion of the circularly polarized measuring and reference beams into the linearly polarized beams is effected, since the axes of the ¼ wave plate 240 and ⅛ wave plate 248 are inclined 22.5° and 45°, with respect to the polarization planes of the measuring and reference beams 1e, 1c during transmission in the direction toward the prisms 54, 52, respectively. The linearly polarized measuring and reference beams from the wave plates 240, 248 are combined with each other at the beam splitter 238, into mutually interfering beams 1a, 1b whose polarization planes are perpendicular to each other and whose phases are shifted by 90° from each other, as indicated in FIG. 31. These interfering beams 1a, 1b are transmitted through the optical fiber 220 as the two modes $HE_{11}{}^x$ and $HE_{11}{}^y$, toward the transmitter/receiver portion 100′.

The beams 1a, 1b emitted from the proximal end of the optical fiber 220 are converted by the converging lens 218 into parallel rays, and separated from each other by the polarizing beam splitter 216. The linearly polarized beam 1b of the interfering beams 1a, 1b transmitted through the optical fiber 220 is reflected by the beam splitter 216 and is received by the first photosensor 224, which produces a corresponding electric signal. The linearly polarized beam 1a is transmitted through the beam splitter 216, transmitted through the Faraday effect element 214 and polarizing beam splitter 212, and received by the second photosensor 228, which produces a corresponding electric signal. Since the linearly polarized beams 1a, 1b have a phase difference of 90° as indicated above, the electric signals produced by the first and second photosensors 224, 228 as sine and cosine waves which are counted at 90° intervals by a pulse counter provided in a phase difference detecting circuit 260. If the subject 50 is rotated in a plane parallel to the planes which include the beams incident upon or reflected by the first and second prisms 52, 54, the rotating angle of the subject 50 may be accurately detected as a change in the phase difference which is represented by the count of the pulse counter.

Figure 6:
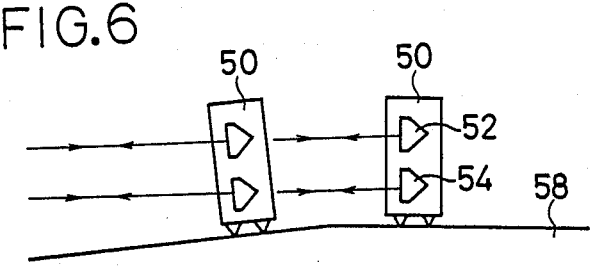
FIGS. 6, 7 and 8 are views explaining applications of the optical fiber sensor of FIG. 1 other than the application illustrated in FIGS. 2-5, showing measurement of straightness, displacement and length, respectively.

When the two prisms 52, 54 are provided on each of two spaced-apart subjects 50, 50 placed on the surface plate 58, as shown in FIG. 6, the straightness of the surface of the surface plate 58 may be accurately represented by the output of the detecting circuit 260.

When the first prism 52 is secured on the sensor head portion 102′ while the second prism 54 is secured on the movable table 60, as indicated in FIG. 7, the amount of a displacement of the movable table 60 relative to the sensor head portion 102′ can be detected by the detecting circuit 260.

When the second prism 54 is fixed to a movable member of a contact type measuring device such as a slide caliper or micrometer, as indicated in FIG. 8, lengths of desired subjects may be accurately detected by the detecting circuit 260.

In the present embodiment, the linearly polarized beam for producing the reference and measuring beams is transmitted through the optical fiber 220 toward the sensor head portion 102′ as one of the two transmission modes, and the reference and measuring beams 1e, 1c are transmitted backward through the optical fiber 220 as the two transmission modes whose polarization planes are perpendicular to each other. Consequently, the instant embodiment eliminates an influence of temperature, strain, vibration and other external factors associated with the optical fiber 220, on a change in the transmission parameter, i.e., on a change in the phase difference between the reference and measuring beams. That is, the detected change in the phase difference represents only the amount of relative displacement of the first and second prisms 52, 54. Thus, the rotating angle of the subject 50, the straightness of the surface plate 58 and the distance of movement of the movable table 60 can be measured with high accuracy. Where a He-Ne laser is used as the laser source 210 and the counting of the pulse counter is effected at 90° intervals, the instant sensor provides detecting resolution of 0.1 micron.

Further, since the transmitter/receiver portion 100' and the sensor head portion 102' are optically coupled by the single optical fiber 220, the sensor may be designed compact and small-sized. In addition, the measuring accuracy and reliability are not influenced or deteriorated by air streams surrounding the optical path.

The above embodiment of FIG. 28 may be modified as needed. In the embodiment of FIG. 28, the sensor head portion 102' is adapted to irradiate the first and second corner cube prisms 52, 54 fixed on the subject 50.

While the ¼ wave plate 240 and the ⅛ wave plate 248 function as means for changing the phases and polarization planes of the reference and measuring beams, these wave plates may be replaced by other optical components capable of changing the phases of the beams.

Figure 33:
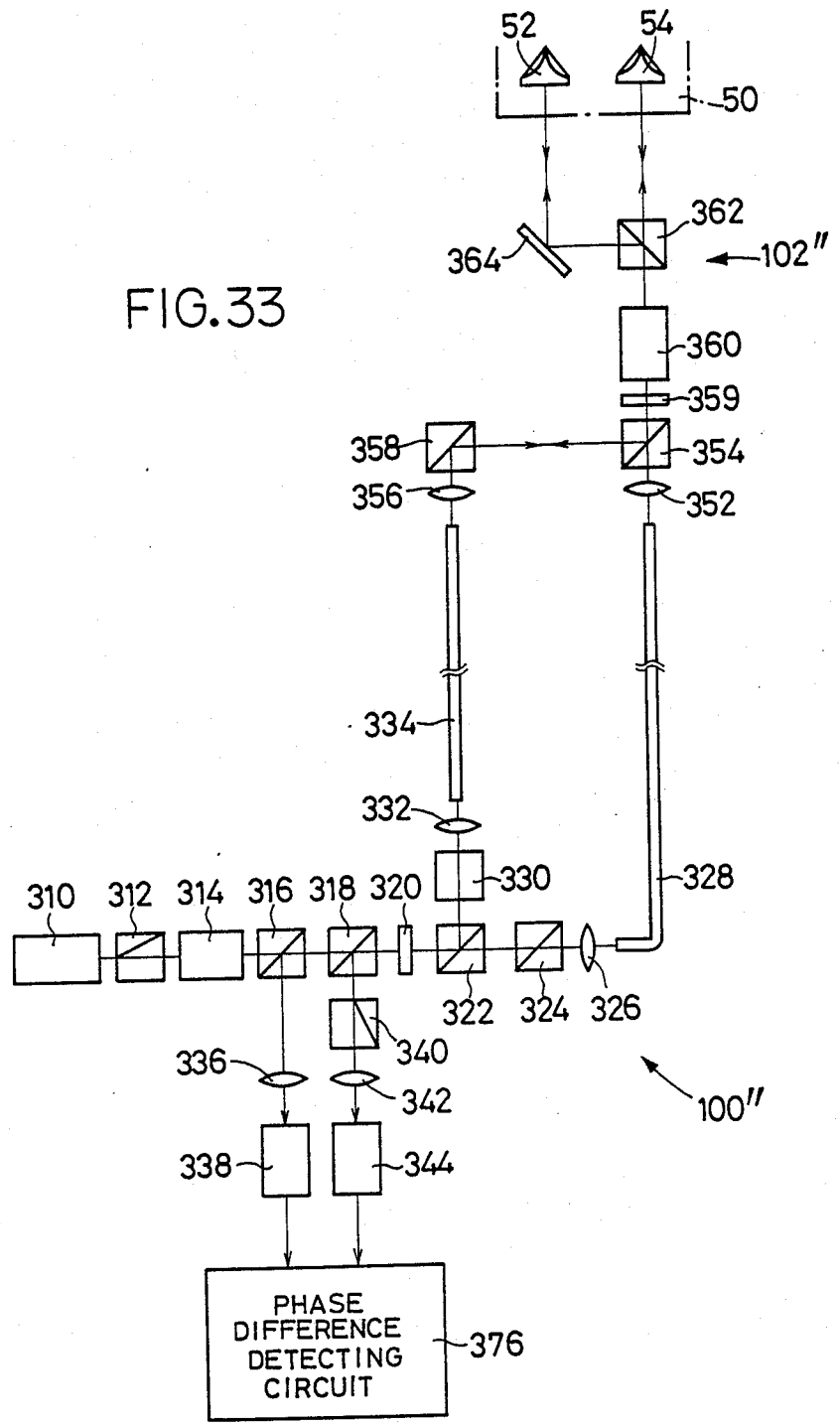
FIGS. 33 is a view showing still another embodiment of the invention.

Referring next to FIG. 33, there is shown a yet further embodiment of the invention in the form of an optical fiber sensor of the optical homodying type, wherein a monochrome laser beam emitted by a He-Ne or other laser source 310 is transmitted through a polarizing beam splitter 312 rotated 45° about the optical axis, a Faraday effect element 314, a polarizing beam splitter 316, a non-polarizing beam splitter 318 and a ¼ wave plate 320. The laser beam is then split by a polarizing beam splitter 322 into two linearly polarized beams. The linearly polarized beam transmitted through the beam splitter 322 is transmitted through a polarizing beam splitter 324 and converged by a converging lens 326 on the proximal end face of a fixed-polarization-plane optical fiber 328. At the same time, the linearly polarized beam reflected by the beam splitter 322 is transmitted through a polarizing beam splitter 332 and converged by a convering lens 332 on the proximal end face of another fixed-polarization-plane optical fiber 334. The beam splitter 312, Faraday effect element 314 and beam splitter 316 function as an optical isolator for protecting the laser source 310 from the reflected beams. The polarizing beam splitter 316 also functions to reflect a component of the reflected beam so that the reflected component is received by a first photosensor 338 via a converging lens 336. The non-polarizing beam splitter 318 also functions to reflect a component of the reflected beam, without depending upon the polarization planes of the components to be reflected and transmitted. A part of the component reflected by the beam splitter 318 is transmitted through a polarizing beam splitter 340 which is positioned 45° rotated about the optical axis. The transmitted part is received by a second photosensor 344 through a converging lens 342. The ¼ wave plate 320 indicated above is used to convert a linearly polarized beam into a circularly polarized beam. The above-described photosensors 338, 344 and other optical elements constitute a light transmitter/receiver portion 100" of the instant optical fiber sensor. The proximal ends of the optical fibers 328 and 334 are fixed to a housing which accommodates the transmitter/receiver portion 100".

Figure 34:
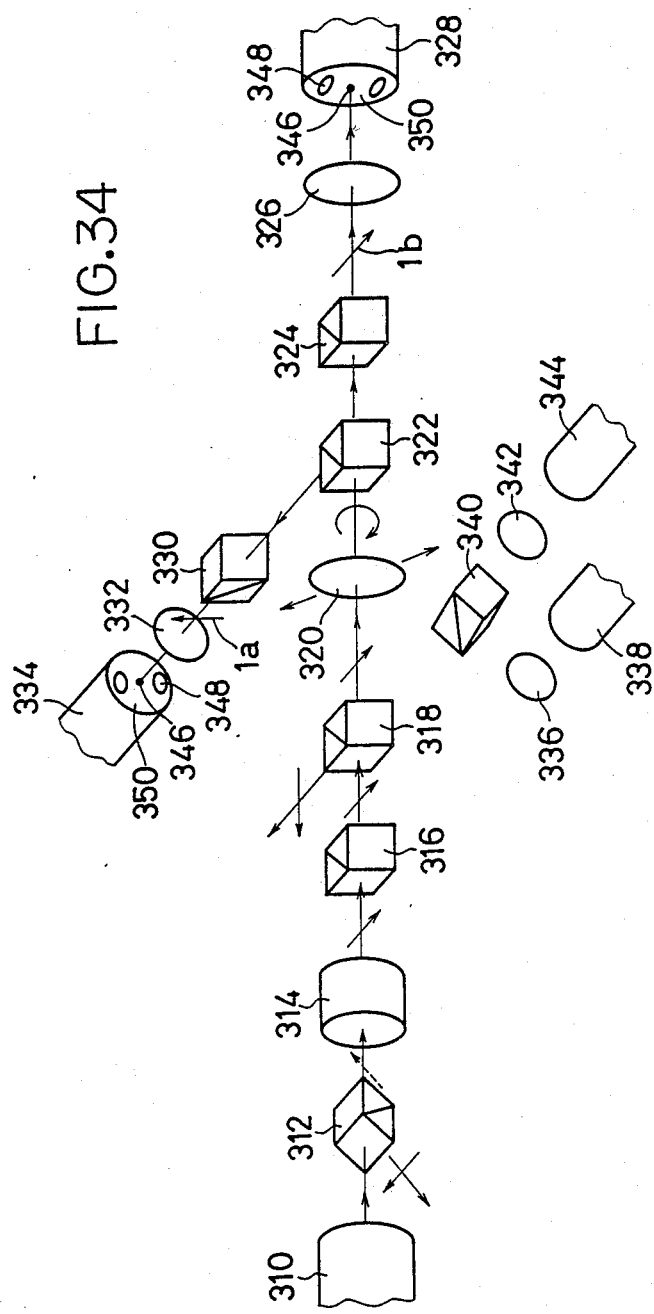

As shown in FIG. 34, each of the optical fibers 328, 334 consists of a core 346, a pair of stressing portions 348 sandwiching the core 346, and a clad 350 covering the core and stressing portions 346, 348. Each optical fiber 328, 334 is capable of transmitting a beam in the two transmission modes, for example, $HE_{11}^x$, $HE_{11}^y$ having mutually perpendicular polarization planes, such that the polarization planes are maintained. However, the present embodiment is adapted such that a linearly polarized beam is incident upon each optical fiber 328, 334 such that the incident beam is aligned with one of the two transmission modes. For example, the linearly polarized measuring beam incident upon the optical fiber 328 is transmitted therethrough as the $HE_{11}^x$ mode, while the linearly polarized reference beam incident upon the optical fiber 334 is transmitted therethrough as the $HE_{11}^y$ mode. Therefore, the optical fibers 328, 334 may be replaced by single-polarization-plane single-mode optical fibers wherein a beam is transmitted in one of two transmission modes with the other transmission mode being positively attenuated for increased loss. Further, ordinary single-mode optical fibers may be used where the operating environments of the sensor are relatively stable.

The distal ends of the optical fibers 328, 334 are fixed to a frame of a sensor head portion 102". The measuring beam transmitted through the optical fiber 328 and emitted from its distal end is converted by a converging lens 352 into parallel rays, and transmitted through a polarizing beam splitter 354. This beam splitter 354 transmits only a linearly polarized beam which has the same polarization plane as the measuring beam transmitted through the optical fiber 328. Similarly, the reference beam transmitted through the optical fiber 334 is converted by a converging lens 356 into parallel rays, and reflected by a polarizing beam splitter 358. The reference beam reflected by the beam splitter 358 is reflected by the beam splitter 354 and thereby combined with the measuring beam. The polarizing beam splitter 358 reflects only a linearly polarized beam which has the same polarization plane as the reference beam transmitted through the optical fiber 334.

The combined measuring and reference beams are incident upon a ½ wave plate 359 whereby the polarization planes of the beams are rotated by 45°. After the polarization planes of the measuring and reference beams are further rotated by 45° by a Faraday effect element 360, the beams are separated from each other by a polarizing beam splitter 362, so that the reference beam reflected by the beam splitter 362 is reflected by a mirror 364 toward the first corner cube prism 52 fixed on the subject 50, while the measuring beam transmitted through the beam splitter 362 is incident upon the second corner cube prism 54 also fixed on the subject 50. In the present embodiment, the polarizing beam splitter 362, mirror 364 and other elements constitute the sensor head portion 102".

Referring to FIG. 34, an operation of the present embodiment will be described in detail. In the figure, the polarization plane of the measuring beam transmitted through the optical fiber 328 as the mode $HE_{11}^y$ is denoted by reference characters 1b, while the polarization plane of the reference beam transmitted through the optical fiber 334 as the mode $HE_{11}^x$ is denoted by reference numerals 1a.

A component of the linearly polarized laser beam produced by the laser source 310 is externally radiated by the polarizing beam splitter 312, while the other component having the polarization plane perpendicular to that of the externally radiated component is transmitted through the beam splitter 312. Dashed-line arrow in FIG. 34 indicates the polarization plane of the linearly polarized beam transmitted through the beam splitter 312. The polarization plane of this linearly polarized beam is rotated clockwise by 45° by the Faraday effect element 314, and the beam is transmitted through the beam splitters 316, 318. Then, the linearly polarized beam is converted into the circularly polarized beam by the ¼ wave plate 320. This circularly polarized beam is equivalent to two linearly polarized beams whose phases are shifted from each other by 90° and whose polarization planes are perpendicular to each other. Therefore, the circularly polarized beam incident upon the polarizing beam splitter 322 is converted into the two linearly polarized beams having the mutually perpendicular polarization planes and a phase difference of 90°. These linearly polarized beams are transmitted through the respective optical fibers 328, 334 as one and the other of the two transmission modes $HE_{11}^x$, $HE_{11}^y$, which correspond to the reference and measuring beams 1a, 1b, respectively. The component of the laser beam externally radiated by the non-polarizing beam splitter 318 is used to monitor the output of the laser source 310.

As shown in detail in FIG. 35, the reference and measuring beams 1a, 1b emitted from the distal ends of the optical fibers 334, 328 are converted by the respective converging lens 356, 352 into parallel rays, and are combined at the polarizing beam splitter 354. The polarization planes of the reference and measuring beams 1a, 1b are rotated counterclockwise by 45° by the ½ wave plate 359, and rotated clockwise by 45° by the Faraday effect element 360. The reference and measuring beams 1a, 1b are separated by the polarizing beam splitter 362 such that the reflected reference beam 1a and the transmitted measuring beam 1b are directed to the first and second corner cube prisms 52, 54, in parallel to each other.

The reference and measuring beams 1a, 1b reflected by the first and second prisms 52, 54 are transmitted toward the transmitter/receiver portion 100" along the optical path along which the beams are transmitted toward the prisms 52, 54. However, upon reflection of the beams 1a, 1b by the prisms 52, 54, the polarization planes are rotated by 180°. Therefore, the polarization planes of the reference and measuring beams 1a, 1b which have been rotated counterclockwise by 45° by the Faraday effect element 360 and clockwise by 45° by the ½ wave plate 359 are rotated by 90° with respect to those during the transmission toward the prisms 52, 54, as illustrated in FIG. 36. As a result, the reflected reference and measuring beams 1a, 1b are split by the polarizing beam splitter 354 in the different directions from those during the transmission toward the prisms 52, 54, so that the reference and measuring beams 1a, 1b are transmitted toward the transmitter/receiver portion 100" through the optical fibers 328 and 334, respectively. Thus, the relationship between the optical fibers 328, 334 and the reference and measuring beams 1a, 1b are reversed between the transmission of the beams toward the sensor head portion 102" (prisms 52, 54) and the transmission toward the transmitter/receiver portion 100". Thus, the Faraday effect element 360, polarizing beam splitter 354 and other elements serve as guiding means for directing the reference and measuring beams 1a and 1b from the sensor head portion 102" respectively to the optical fibers 328, 334 which have been used for transmitting the beams 1b and 1a, respectively, from the transmitter/receiver portion 100" toward the sensor head portion 102". That is, the Faraday effect element 360 and polarizing beam splitter 354 function to change the relationship between the optical fibers 328, 334 and the beams 1a, 1b, depending upon the direction of transmission of the reference and measuring beams 1a, 1b.

Figure 37:
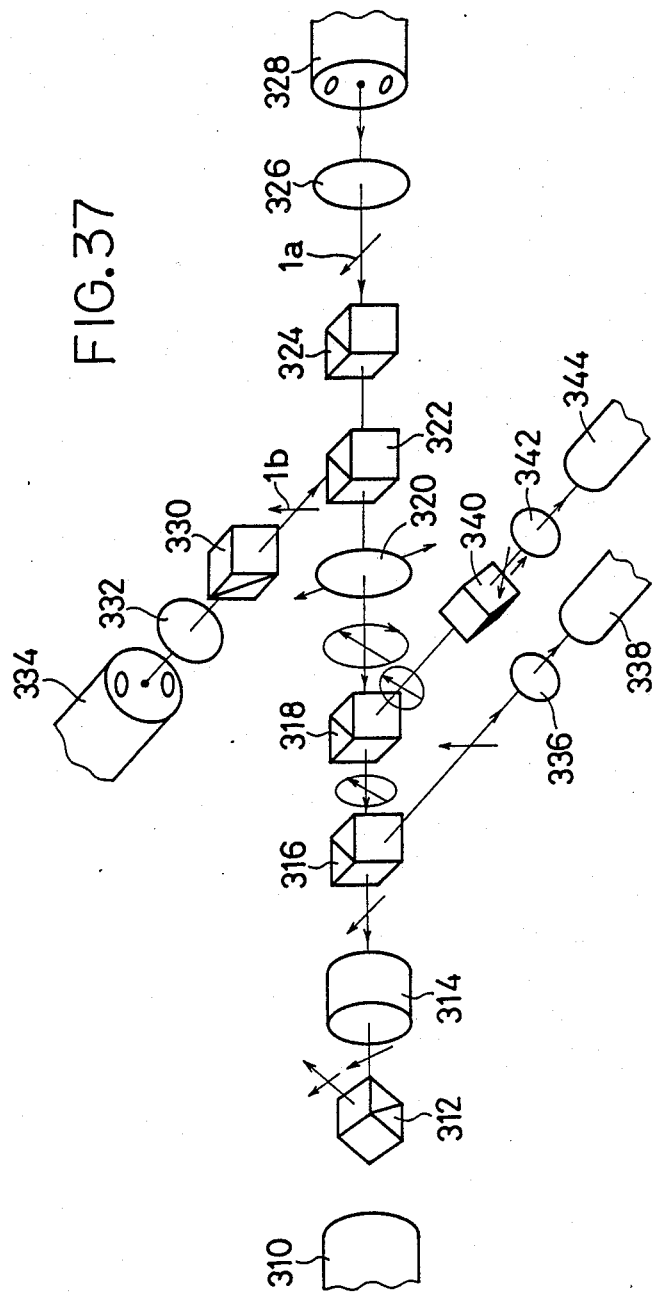

As illustrated in FIG. 37, the reference and measuring beams 1a, 1b emitted from the proximal ends of the optical fibers 328, 334 are converted into parallel rays by the respectively converging lenses 326, 332, and converted by the ¼ wave plate 320 into the clockwise and counterclockwise circularly polarized beams. However, since the reference and measuring beams 1a, 1b have the same amplitude, the two circularly polarized beams interfere with each other and are therefore converted into a linearly polarized beam whose polarization plane is determined by a phase difference between the reference and measuring beams 1a, 1b. For example, if the phase difference is changed by $2\pi$, the polarization plane of the linearly polarized beam is rotated by 360°. This linearly polarized beam is split by the non-polarizing beam splitter 318 into two components, which are received by the first and second photosensors 338, 344, through the two polarizing beam splitters 316, 340 which are rotated by 45° with respect to each other.

The output signals of the first and second photosensors 338, 344 are received by a phase difference detecting circuit 376, to detect an amount of change in the phase difference represented by the received outputs of the photosensors 338, 344. This change in the phase difference is caused by a difference between the lengths of the optical paths of the reference and measuring beams 1a, 1b from the sensor head portion 102" to the prisms 52, 54 disposed on the subject 50. Due to the difference of the optical path lengths indicated above, the phases of the reference and measuring beams 1a, 1b reflected by the prisms 52, 54 are changed by different amounts, and the outputs of the first and second photosensors 338, 344 represent the amounts of changes of the phases of the beams 1a, 1b, which are compared with each other by the phase difference detecting circuit 376. If the subject 50 is rotated by a given angle in a plane parallel to the plane which includes the optical axes of the beams 1a, 1b incident upon or reflected from the first and second prisms 52, 54, the lengths of the optical paths of the beams 1a, 1b indicated above are accordingly changed, whereby the phase difference between the reference and measuring beams 1a, 1b is changed according to the angle of rotation of the subject 50. Thus, an output of the phase difference detecting circuit 376 accurately represents the angle of rotation of the subject 50.

The polarizing beam splitters 322, 324, 330, 354 and 358 used in the present embodiment also function to eliminate crosstalk components and stray light components which occur during transmission of the reference and measuring beams. For instance, the polarizing beam splitter 358 substantially eliminates a crosstalk component ($HE_{11}^y$ mode component) which occurs while the reference beam 1a travels through the optical fiber 334 as the mode $HE_{11}^x$ in the direction from the transmitter/receiver portion 100" toward the sensor head portion 102". A fraction of the crosstalk component which is reflected by the beam splitter 358 is eliminated during transmission through the beam splitter 354. The crosstalk components which occur during transmission of the measuring beam 1b toward the sensor head portion 102" and during transmission of the reference and measuring beams 1a, 1b toward the transmitter/receiver portion 100" can be similarly eliminated. Since the above-indicated crosstalk eliminating function of the beam splitters 324, 330, 358 are ancillary, it is possible to replace the beam splitter 358 by a mirror and eliminate the beam splitters 324, 330. Further, the fixed-polarization-plane optical fibers 328, 334 are used to transmit the beams 1a, 1b in only one of the two transmission modes. However, these optical fibers may be replaced by single-mode optical fibers wherein only one of the two modes is transmitted while the other mode is positively suppressed or attenuated.

It follows from the above description of the present embodiment that the reference and measuring beams 1a, 1b are transmitted through the two optical fibers 328, 334, independently of each other, without mutual interference. Further, the two optical fibers 328, 334 are disposed in parallel to each other between the transmitter/receiver portion 100" and the sensor head portion 102", and the optical fibers 334, 328 respectively used for transmitting the reference and measuring beams 1a, 1b toward the sensor head portion 102" are respectively used for transmitting the reflected measuring and reference beams 1b, 1a toward the transmitter/receiver portion 100". According to this arrangement, an influence of temperature, strain, vibration and other external factors associated with the optical fibers 328, 334 on the transmission parameter (phase) of the measuring beam 1b is suitably counterbalanced by an influence of the same external factors on the transmission parameter (phase) of the reference beam 1a. Consequently, the detected change in the phase difference between the reference and measuring beams 1a, 1b represents only a change in the relative displacement of the first and second corner cube prisms 52, 54, whereby the rotating angle of the subject 50 can be accurately measured.

In the instant optical fiber sensor of FIG. 33 of the optical homodyning type using the monochrome light source, the initial phase difference of between the reference and measuring beams at the light transmitter/receiver portion 100" can be set at 90° at which the phase difference is most responsive to a change in the rotating angle of the subject 50. This setting of the initial phase difference can be achieved by adjusting the angular position of the polarizing beam splitter 340 about the optical axis. Thus, the instant sensor does not require an piezoelectric element to mechanically stress the sensor head portion 102" so as to establish a phase difference of $\pi/2$ between the reference and measuring beams. Hence, the instant sensor does not require means for applying electric power to such a piezoelectric element, or eliminates the otherwise required means for controlling the wavelength of the beam produced by the light source 310. Further, the transmitter/receiver portion 100" and the sensor head portion 102" are optically connected by the two optical fibers 328, 334, and the sensor head portion 102" can be designed compact, consisting solely of small-sized optical elements. Accordingly, the sensor head portion 102" is relatively economical to manufacture, and can be easily incorporated in a desired precision measuring, machining or processing, or testing or inspecting device. Furthermore, the S/N ratios of the first and second photosensors 338, 344 can be improved, permitting sufficiently high detecting accuracy of the sensor even where the beam transmission distance is relatively large, since the beam splitters 324, 330, 354 and 358 serve to eliminate the crosstalk components of the reference and measuring beams 1a, 1b which may arise during their transmission through the two optical fibers 328, 334 between the transmitter/receiver and sensor head portions 100", 102".

The present optical fiber sensor may also be used to detect the straightness of the surface plate 58, as indicated in FIG. 6, and an amount of linear movement of the movable table 60, as indicated in FIG. 7. The present sensor is also usable to measure a desired length, as indicated in FIG. 8.

While the polarizing beam splitter 312, Faraday effect element 314 and polarizing beam splitter 316 function as an optoisolator as described above, these elements 312, 316 may be eliminated if the light source 310 employs a light-emitting diode (LED) or a super-luminescent diode (SLD) which is less likely to be influenced by a reflected light beam. Where a He-Ne laser is used together with a ultrasonic modulator whose frequency is 2 GHz, the optical isolator indicated above may be eliminated, since the frequency of the reflected beam falls outside the gain band of the He-Ne laser. When a semi-conductor laser or other directly modulatable light source is used, the optical isolator may be eliminated by switching off the light source while the reflected beam is incident upon the light source, by utilizing time delays of the optical fibers 328, 334.

Figure 38:
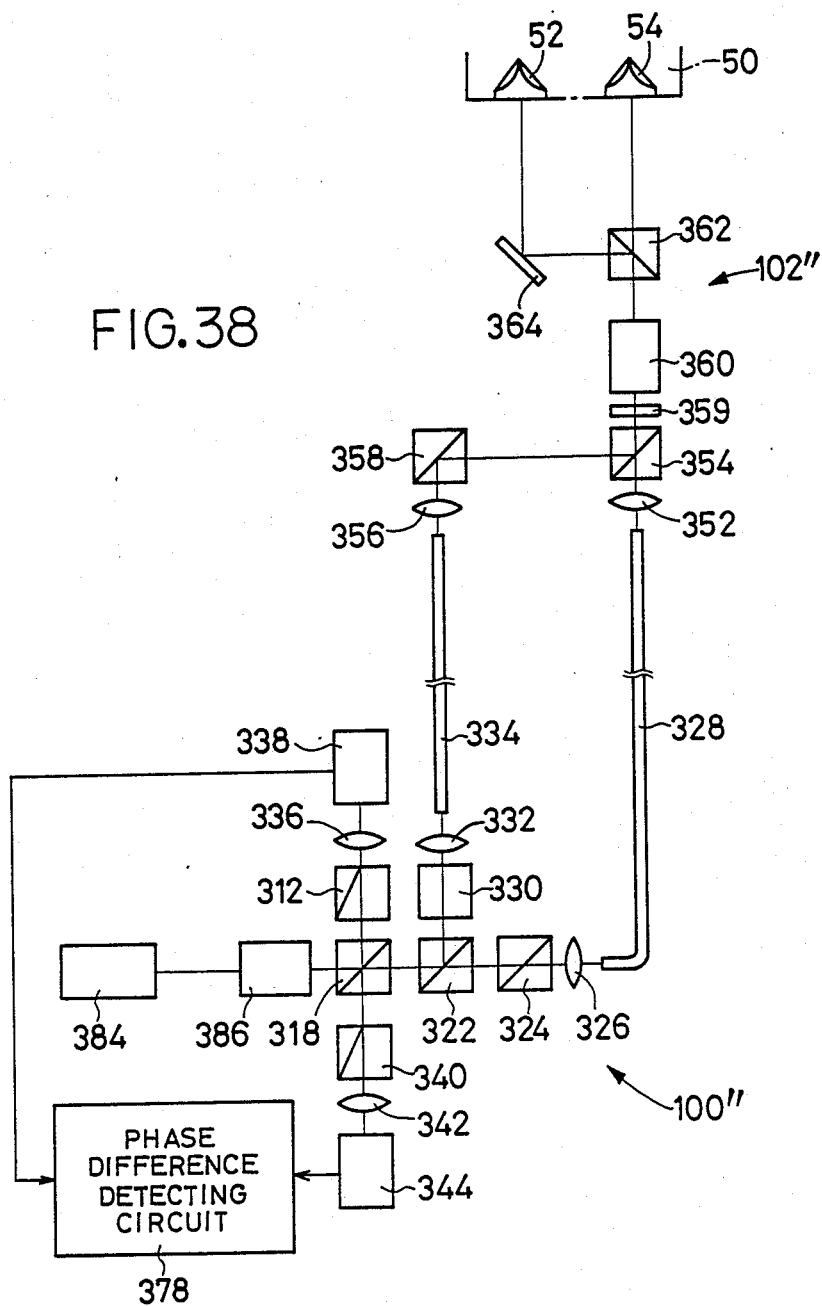
FIGS. 38 and 39 are views showing another embodiment of the invention.

Referring further to FIG. 38, there will be described a yet another embodiment of the present invention.

In the present embodiment, the phase difference between the reference and measuring beams is detected by the transmitter/receiver portion 100", in the frequency-modulating or optical heterodyning method. More specifically, the instant embodiment employs a laser source 384 in the form of a He-Ne laser of the horizontal Zeeman type capable of producing two linearly polarized beams whose frequencies are slightly different from each other and less likely to fluctuate, and whose polarization planes are perpendicular to each other. The linearly polarized beams are modulated by an acousto-optic modulator 386, and split by the non-polarizing beam splitter 318 into two components. The linearly polarized beam reflected by the beam splitter 318 is received by the first photosensor 338 via the polarizing beam splitter 312 and converging lens 36. This first photosensor 338 produces a reference beat signal indicative of a beat frequency which arises from a difference in the frequency between the reference and measuring beams. On the other hand, the linearly polarized beam propagated through the non-polarizing beam splitter 318 is split by the polarizing beam splitter 322, so that the divided components are transmitted as the measuring and reference beams through the respective optical fibers 328, 334 toward the sensor head portion 102". As in the preceding embodiments, the reference and measuring beams reflected by the subject 50 and transmitted through the optical fibers 328, 334 toward the beam splitter 318 are reflected by the beam splitter 318 and received by the second photosensor 344 through the beam splitter 340 and converging lens 342. This second photosensor 344 produces a measuring beat signal indicative of a beat frequency which arises from a difference in the frequency between the linearly polarized reference and measuring beams which have been received. A phase difference between the reference beat signal and the measuring beat signal is detected by a phase difference detecting circuit 378. The detected phase difference represents a change in the transmission parameter included in the measuring beam which is influenced by a change on the subject 50. In this embodiment, the optical frequency modulator 86 serves as an optoisolator.

In this embodiment, too, the measuring and reference beams are transmitted toward the sensor head portion 102" through the optical fibers 328, 334, respectively, while the measuring and reference beams reflected by the prisms 54, 52 are transmitted toward the transmitter/receiver portion 100" through the optical fibers 334, 328, respectively. Further, the polarizing beam splitters 322, 324, 330, 354, 358 eliminate the crosstalk components of the beams and thereby improves the S/N ratios of the output signals of the first and second photosensors 338, 344.

In the embodiment of FIG. 38, there is formed a closed optical path or loop which connects the following elements in the order of description: polarizing beam splitter 322, polarizing beam splitter 324, converging lens 326, optical fiber 328, converging lens 352, polarizing beam splitter 354, polarizing beam splitter 358, converging lens 356, optical fiber 334, converging lens 332, polarizing beam splitter 330 and polarizing beam splitter 322. The light beam travelling in the counterclockwise direction past the beam splitter 322, beam splitter 324, converging lens 326, optical fiber 328, converging lens 352, and beam splitter 354 of the above-indicated optical loop is provided at the sensor head portion 102" with phase information. The light beam provided with the phase information travels through the remaining part of the optical loop, again in the counterclockwise direction, past the beam splitter 358, conveying lens 356, optical fiber 334, converging lens 332 and beam splitter 330. Similarly, the light beam travelling in the clockwise direction past the beam splitter 322, beam splitter 330, converging lens 332, optical fiber 334, converging lens 356, beam splitter 358 and beam splitter 354 of the optical loop is also provided at the sensor head portion 102" with phase information. The light beam provided with the phase information travels through the remaining part of the optical loop, again in the clockwise direction, past the converging lens 352, optical fiber 328, converging lens 326, beam splitter 324. Thus, the instant optical fiber sensor constructed as described above is similar to an arrangement of a so-called optical fiber gyro wherein two light beams travel in opposite directions over a ring-shaped path, to measure an angular velocity with respect to the space, based on a phase difference between the two beams. Thus, various methods as used for an optical fiber gyro, such as phase difference biasing, phase modulation, frequency modulation and optical heterodyning are applicable to detect a change or variation in a transmission parameter (e.g., phase) of a light beam or beams according to the present invention.

Figure 39:
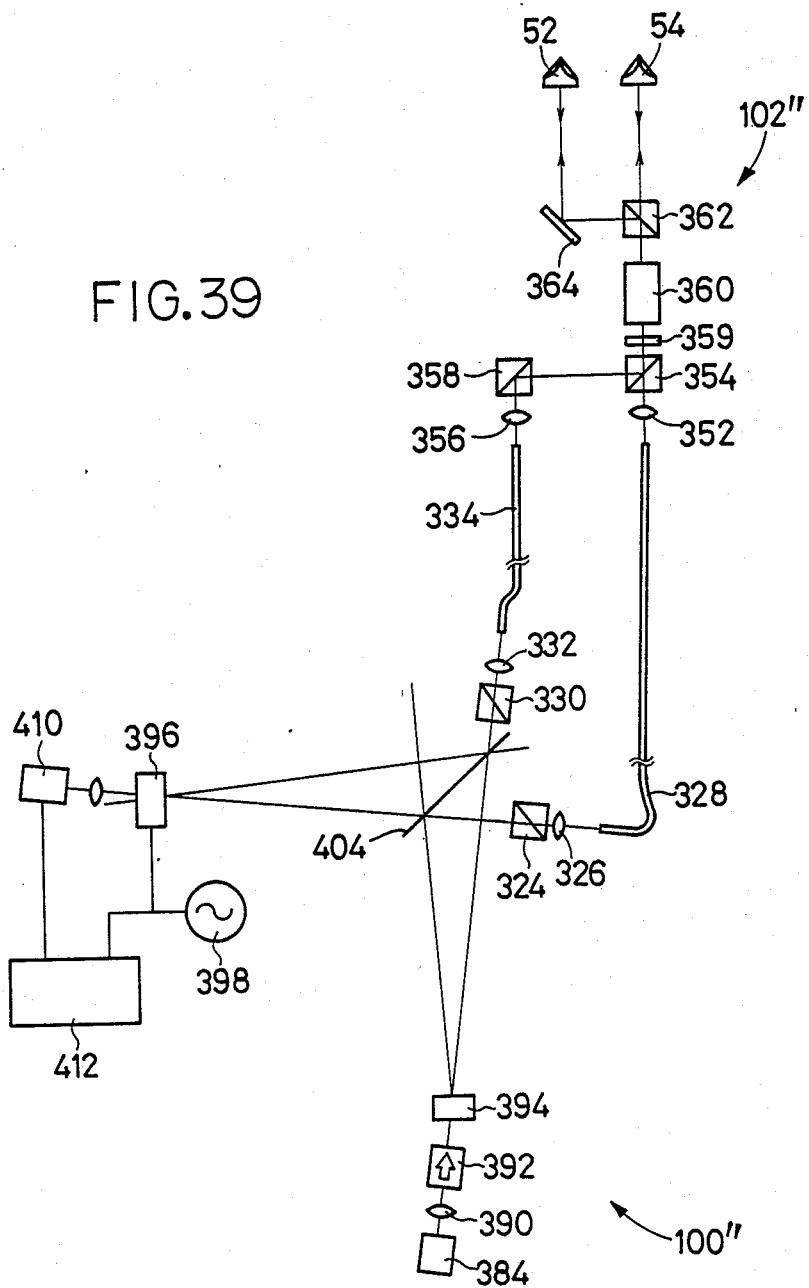

FIG. 39 illustrates an arrangement of an example of the optical fiber gyro heterodyning method as applied to the sensor head portion 102".

In the arrangement of FIG. 39, a laser beam produced by the laser source 384 is converted by a converging lens 390 into parallel rays, and is transmitted through an optoisolator 392. Then, the laser beam is subjected to diffraction by a diffraction grating element 394, whereby the beam is split into two beams which form an extremely small angle in the neighborhood of 10 mrad (milli-radian). One of these two beams is reflected by a non-polarizing beam splitter 404, and is incident upon the optical fiber 328 through the polarizing beam splitter 324 and converging lens 326. This beam travels in the counterclockwise direction along a closed optical path or loop defined by the elements 324, 326, 328, 352, 354, 358, 356, 344, 332 and 330. The other beam emitted from the diffraction grating 394 is progapated through the non-polarizing beam splitter 404, and is incident upon the other optical fiber 334 through the polarizing beam splitter 330 and converging lens 332. This beam travels in the clockwise direction along the above-indicated optical path. The clockwise and counterclockwise travelling beams are reflected by the first and second corner cube prisms 52, 54 fixed on a subject to be measured, and are respectively incident upon the optical fibers 328 and 334, which have been used to transmit the counterclockwise and clockwise beams during their transmission toward the sensor head portion 102". The reflected clockwise beam transmitted through the optical fiber 328 is transmitted through the converging lens 326, polarizing beam splitter 324 and non-polarizing beam splitter 404, and is received by an acouto-optical element (AOM) 396. In the meantime, the reflected counterclockwise beam transmitted through the optical fiber 334 is transmitted through the converging lens 332 and polarizing beam splitter 330, reflected by the non-polarizing beam splitter 404, and received by the acousto-optical element (AOM) 396. This acousto-optical element 396 is an optical frequency shifter, which also functions as a directional coupler Therefore, the reflected two beams incident upon the element 396 combine with each other and interfere with each other, under the control of an oscillator 398. One of the two beams is frequency-modulated and received by a photosensor 410, which produces a measuring beat signal. Based on the beat signal from the photosensor 410 and a reference signal to drive the oscillator 398, a phase difference detecting circuit 412 produces an output signal indicative of a change in the relative displacement of the first and second prisms 52, 54. In the instant embodiment, too, the transmitter/receiver portion 100" and the sensor head portion 102" are optically coupled by the two fixed-polarization-plane optical fibers 328, 334. Further, each of the clockwise and counterclockwise beams indicated above is transmitted through one of the two optical fibers 328, 334 during the transmission toward the sensor head portion 102", and through the other of the optical fibers during the transmission back toward the transmitter/receiver portion 100". Consequently, like the preceding embodiment, the instant embodiment is adapted to suitably eliminate otherwise possible lowering of the S/N ratios due to the crosstalks of the transmission beams, even where the distance of transmission of the beam through the optical fibers 328, 334 is relatively long.

While the present invention has been described in its presently preferred embodiments with a certain degree of particularity for illustrative purpose only, it is to be understood that various changes and modifications may be made in the invention, without departing from the spirit and scope of the invention defined in the following claims.

What is claimed is:

1. An optical fiber sensor for detecting a change in a transmission parameter of a measuring beam, based on the measuring beam and a reference beam, comprising:

an optical fiber for transmitting said measuring and reference beams respectively in a first and a second transmission mode which have mutually perpendicular polarization planes, such that said polarization planes are maintained;

a light transmitter/receiver portion for producing said measuring and reference beams and directing the measuring and reference beams to said optical fiber so that the beams are transmitted in said respective two transmission modes in a first direction from a proximal end of the optical fiber to a distal end thereof, said light transmitter/receiver portion being operable to detect said change in said transmission parameter of said measuring beam, based on said measuring and reference beams which have been returned through said optical fiber in a second direction from said distal end toward said proximal end thereof;

a sensor head portion operable to receive said measuring and reference beams transmitted through said optical fiber in said first direction, and causing said transmission parameter of at least said measuring beam to be influenced by a change of an external subject, said sensor head portion returning the measuring and reference beams to said light transmitter/receiver portion through said optical fiber in said second direction; and said sensor head portion including a Faraday effect element for rotating the polarization planes of said measuring and reference beams before said beams are incident upon said distal end of said optical fiber in said second direction so that said measuring and reference beams are transmitted through said optical fiber in said second direction in said second and first transmission modes, respectively.

2. An optical fiber sensor according to claim 1, wherein said light transmitter/receiver portion includes a laser source for producing a linearly polarized laser beam, a ¼ wave plate for converting said linearly polarized beam into a circularly polarized beam so that said circularly polarized beam is transmitted through said optical fiber in said first and second transmission modes in said first direction, a first and a second photosensor for receiving respectively said measuring and reference beams which have been returned through said optical fiber in said second direction, and a detecting circuit receiving outputs of said first and second photosensors and producing an output indicative of a phase difference between the returned measuring and reference beams.

3. An optical fiber sensor according to claim 1, wherein said light transmitter/receiver portion includes a laser source for producing a linearly polarized laser beam, a ¼ wave plate for converting said linearly polarized beam into a circularly polarized beam so that said circularly polarized beam is transmitted through said optical fiber in said first and second transmission modes in said first direction, a first and a second photosensor for receiving respectively said measuring and reference beams which have been returned in said second direction through said second direction and through said ¼ wave plate and a polarizing beam splitter, a ½ wave plate disposed between said polarizing beam splitter and said ¼ wave plate and rotatable to a controlled angular position, and a detecting circuit receiving outputs of said photosensor means and a signal representative of said controlled angular position of said ½ wave plate, said detecting circuit producing an output indicative of a phase difference between the returned measuring and reference beams.

4. An optical fiber sensor according to claim 1, wherein said light transmitter/receiver portion includes a laser source for producing a linearly polarized laser beam, a polarizing beam splitter for converting said linearly polarized beam into linearly polarized measuring and reference beams having mutually perpendicular polarization planes, and directing said measuring and reference beams so as to be incident upon said distal end of said optical fiber so that said measuring and reference beams are transmitted through said optical fiber in said first and second transmission modes in said first direction, a first and a second photosensor for receiving respectively said measuring and reference beams which have been returned through said optical fiber in said second direction in said second and first transmission modes, and a device disposed between said proximal end of said optical fiber and said first and second photosensors, in one of optical paths of said measuring and reference beams, for zeroing an initial phase difference between said measuring and reference beams or establishing an initial phase difference of $\pi/2$ between said measuring and reference beams.

5. An optical fiber sensor according to claim 1, wherein said light transmitter/receiver portion includes a laser source for producing two linearly polarized laser beams having mutually perpendicular polarization planes and different frequencies, a reference beat photosensor receiving said laser beams to produce a reference beat signal, a measuring beat photosensor receiving said measuring and reference beams returned through said optical fiber in said second direction in said second and first transmission modes, and producing a measuring beat signal, and a detecting circuit receiving said reference and measuring beat signals of said reference and measuring beat photosensors and producing an output indicative of a phase difference between said reference and measuring beat signals.

6. An optical fiber sensor according to claim 1, wherein said light transmitter/receiver portion includes a laser source for producing a linearly polarized laser beam, a frequency modulator for converting said laser beam into a modulated linearly polarized beam whose polarization plane is rotated at a predetermined frequency, a photosensor for receiving said modulated linearly polarized beam and producing a reference signal, a ¼ wave plate for converting said modulated linearly polarized beam into two linearly polarized beams having two mutually perpendicular polarization planes so that said two linearly polarized beams are transmitted as said measuring and reference beams through said optical fiber in said first direction in said first and second transmission modes, and a photosensor receiving said measuring and reference beams which have been returned through said optical fiber in said second direction and through said ¼ wave plate, and producing a measuring signal.

7. An optical fiber sensor according to claim 1, wherein said light transmitter/receiving portion includes a laser source for producing a pulse-driven linearly polarized laser beam, a polarizing beam splitter for converting said laser beam into two linearly polarized beams having to mutually perpendicular polarization planes as said measuring and reference beams so that said measuring and reference beams are transmitted through said optical fiber in said first direction in said first and second transmission planes, a first and a second photosensors for receiving said measuring and reference beams which have been returned through said optical fiber in said second direction as said second and first transmission modes, and a detecting circuit receiving outputs of said first and second photosensors and producing an output indicative of a difference in transmission time delay between said measuring and reference beams.

8. An optical fiber sensor according to claim 1, wherein said sensor head portion is operable to irradiate a surface of said subject with said measuring beam which has been transmitted through said optical fiber in said first direction, to detect a roughness of said surface, said sensor head portion returning the measuring beam reflected by said surface to said optical fiber for transmission therethrough back to said light transmitter/receiver portion.

9. An optical fiber sensor according to claim 1, wherein said sensor head portion is operable to irradiate a fluid as said subject with said measuring beam which has been transmitted through said optical fiber in said first direction, to detect a flow velocity of said fluid by utilizing a Doppler effect, said sensor head portion returning the measuring beam reflected by said fluid to said optical fiber for transmission therethrough back to said light transmitter/receiver portion.

10. An optical fiber sensor according to claim 1, wherein said sensor head portion is operable to cause at least said measuring beam transmitted through said optical fiber in said first direction, to be transmitted through said subject, before said measuring beam is transmitted through said optical fiber in said second direction back to said light transmitter/receiver portion.

11. An optical fiber sensor according to claim 10, wherein said subject consists of a member selected from the group consisting of a Pockels cell whose refractive index changes in relation to an electric field or voltage applied thereto, lithium niobate whose index of double refraction changes in relation to temperature, and a photoelastic material whose refractive index changes in relation to at least one of pressure, vibration and acceleration applied thereto.

12. An optical fiber sensor according to claim 1, wherein said sensor head portion includes a sensing optical fiber optically coupled to said optical fiber which serves as a transmission optical fiber and which has a reflector film at a distal end thereof, at least said measuring beam transmitted through said transmission optical fiber in said first direction being transmitted through said sensing optical fiber and reflected by said reflector film for transmission through said sensing optical fiber back to said transmission optical fiber, such that a phase of said measuring beam is changed in relation to a sound pressure applied to said sensing optical fiber.

13. An optical fiber sensor fo detecting a change in a transmission parameter of a measuring beam, based on the measuring beam and a reference beam, comprising:
  a single optical fiber capable of transmitting a light beam in two transmission modes having mutually perpendicular polarization planes, such that the polarization planes of said two transmission modes are maintained;

a light transmitter/receiver portion for generating said light beam for producing said measuring and reference beams and directing said light beam to said optical fiber so that said light beam is transmitted through said optical fiber in one of said two transmission modes in a first direction from a proximal end of the optical fiber to a distal end thereof, said light transmitter/receiver portion being operable to detect said change in said transmission parameter of said measuring beam, based on said measuring and reference beams which have been returned through said optical fiber in said two transmission modes in a second direction from said distal end toward said proximal end;

a sensor head portion operable to receive said light beam transmitted through said optical fiber in said first direction, and splitting said light beam into said measuring and reference beams, said sensor head portion causing said transmission parameter of at least said measuring beam to be influenced by a change of an external subject, and returning said measuring and reference beams to said light transmitter/receiver portion through said optical fiber in said second direction; and said sensor head portion including adjusting means for adjusting said measuring and reference beams prior to incidence upon said distal end of said optical fiber, so that the measuring and reference beams are returned through said optical fiber in said second direction in said two transmission modes, as two linearly polarized beams having mutually perpendicular polarization planes and a phase difference of 90°.

14. An optical fiber sensor according to claim 13, wherein said light transmitter/receiver portion includes a laser source for producing a linearly polarized laser beam, a pair of photosensors for receiving said measuring and reference beams which have been returned through said optical fiber in said second direction in said two transmission modes, and a detecting circuit receiving outputs of said pair of photosensors and producing an output indicative of a phase difference between the returned measuring and reference beams.

15. An optical fiber sensor according to claim 13, wherein said adjusting means includes a ¼ wave plate which transmits one of said measuring and reference beams therethrough, and ⅛ wave plate which transmits the other of said measuring and reference beams therethrough.

16. An optical fiber sensor for detecting a change in a transmission parameter of a measuring beam, based on the measuring beam and a reference beam, comprising:
  a first and a second optical fiber capable of transmitting a light beam;
  a light transmitter/receiver portion for generating said measuring and reference beams and directing the measuring and reference beams to said first and second optical fibers so that the measuring and reference beams are transmitted through said first and second optical fibers, respectively, in a first direction from a proximal end of each of said first and second optical fibers to a distal end of said each optical fiber, said light transmitter/receiver portion being operable to detect said change in said transmission parameter of said measuring beam, based on said measuring and reference beams which have been returned through said second and first optical fibers, respectively, in a second direction from said distal end toward said proximal end;

a sensor head portion operable to receive said measuring and reference beams transmitted in said first direction through said first and second optical fibers, respectively, and causing said transmission parameter of at least said measuring beam to be influenced by a change of an external subject, said sensor head portion returning said measuring and reference beams to said light transmitter/receiver portion in said second direction through said second and first optical fibers, respectively; and said sensor head portion including guiding means for directing said measuring and reference beams so that said measuring and reference beams are transmitted through said second and first optical fibers, respectively, in said second direction.

17. An optical fiber sensor according to claim 16, wherein each of said first and second optical fibers is selected from the group consisting of a fixed-polarization-plane fiber capable of transmitting a light beam in two transmission modes having mutually perpendicular polarization planes while maintaining the polarization planes, a single-polarization-plane single-mode optical fiber capable of transmitting the light beam selectively in one of said two transmission modes, and a single-mode optical fiber capable of transmitting the light beam in a predetermined transmission mode.

18. An optical fiber sensor according to claim 16, wherein said guiding means is operable to rotate by 90° the polarization planes of said measuring and reference beams transmitted in said first direction through said first and second optical fibers, respectively, after said measuring beam is influenced by said external subject, so that said measuring and reference beams are returned in said second direction toward said transmitter/receiver portion through second and first optical fibers, respectively.

19. An optical fiber sensor according to claim 16, wherein said light transmitter/receiver portion includes a laser source for generating a linearly polarized laser beam having two components having mutually perpendicular polarization planes, separating means for separating said two components of said laser beam into said measuring and reference beams so that said measuring and reference beams are transmitted in said first direction through said first and second optical fibers, respectively, a first and a second photosensor for receiving said measuring and reference beams which have been transmitted in said second direction through said second and first optical fibers, respectively, and a detecting circuit receiving outputs of said first and second photosensors and producing an output indicative of a phase difference between said measuring and reference beams.

20. An optical fiber sensor according to claim 16, wherein said light transmitter/receiver portion includes a laser source for generating two linearly polarized laser beams whose polarization planes are perpendicular to each other and whose phases are slightly different from each other, a reference beat photosensor receiving said two laser beams and producing a reference beat signal, separating means for separating said laser beams into said measuring and reference beams so that said measuring and reference beams are transmitted in said first direction through said first and second optical fibers, respectively, a measuring beat photosensor receiving said measuring and reference beams transmitted in said second direction through said second and first optical fibers, respectively and producing a measuring beat signal, and a detecting circuit receiving said reference and measuring beat signals and producing an output indicative of a phase difference between said beat signals.

21. An optical fiber sensor according to claim 16, wherein said light transmitter/receiver portion includes a laser source for generating a laser beam, separating means for separating said laser beam into said measuring and reference beams so that said measuring and reference beams are incident upon the proximal ends of said first and second optical fibers, respectively, a directional coupler receiving said measuring and reference beams returned from said proximal ends of said second and first optical fibers, alternately at a predetermined operating frequency, for combining said measuring and reference beams for transmission along a single optical path, a photosensor receiving said measuring and reference beams and producing a measuring beat signal, and a detecting circuit receiving said measuring beat signal and a reference signal indicative of said predetermined operating frequency of said directional coupler, and producing an output indicative of a phase difference between said measuring beat signal and said reference signal.

22. An optical fiber sensor according to claim 21, wherein said directional coupler includes an acousto-optical element which diffracts said measuring and reference beams by means of an acousto-optical effect.

* * * * *